US008330641B2

(12) United States Patent
Ryden et al.

(10) Patent No.: US 8,330,641 B2
(45) Date of Patent: Dec. 11, 2012

(54) DIGITAL MULTI-CHANNEL ECM TRANSMITTER

(75) Inventors: Richard W. Ryden, Summit, NJ (US); Len T. LaPinta, Shelton, CT (US); Richard J. Barozzi, Caldwell, NJ (US)

(73) Assignee: Exelis, Inc., McLean, VA (US)

(*) Notice: Subject to any disclaimer, the term of this patent is extended or adjusted under 35 U.S.C. 154(b) by 479 days.

(21) Appl. No.: 12/626,065

(22) Filed: Nov. 25, 2009

(65) Prior Publication Data

US 2011/0122011 A1 May 26, 2011

(51) Int. Cl.
*H04K 3/00* (2006.01)
*G01S 7/38* (2006.01)

(52) U.S. Cl. .................................................. 342/14

(58) Field of Classification Search .................... 342/14
See application file for complete search history.

(56) References Cited

U.S. PATENT DOCUMENTS

| | | | | |
|---|---|---|---|---|
| 3,896,439 | A * | 7/1975 | Lester et al. | 342/14 |
| 6,222,658 | B1 * | 4/2001 | Dishman et al. | 398/205 |
| 6,842,137 | B2 * | 1/2005 | Gounalis | 342/20 |
| 6,873,284 | B2 * | 3/2005 | Gounalis | 342/13 |
| 6,894,634 | B2 * | 5/2005 | Gounalis | 342/13 |
| 6,894,635 | B2 * | 5/2005 | Gounalis | 342/13 |
| 6,917,325 | B2 * | 7/2005 | Gounalis | 342/20 |
| 6,989,780 | B2 * | 1/2006 | Gounalis | 342/13 |
| 7,038,611 | B2 * | 5/2006 | Gounalis | 342/13 |
| 7,068,209 | B2 * | 6/2006 | Gounalis | 342/13 |
| 7,081,846 | B1 * | 7/2006 | Sparrow et al. | 342/14 |
| 7,176,826 | B2 * | 2/2007 | Gounalis | 342/13 |
| 7,193,555 | B2 * | 3/2007 | Gounalis | 342/13 |
| 7,236,119 | B2 * | 6/2007 | Gounalis | 342/20 |
| 7,248,203 | B2 * | 7/2007 | Gounalis | 342/13 |
| 7,348,919 | B2 * | 3/2008 | Gounalis | 342/165 |
| 7,358,887 | B2 * | 4/2008 | Gounalis | 342/20 |
| 7,391,356 | B2 * | 6/2008 | Brumley et al. | 342/13 |
| 7,532,856 | B2 * | 5/2009 | Stoddard et al. | 455/1 |
| 7,719,457 | B1 * | 5/2010 | Tindall | 342/14 |
| 7,728,755 | B1 * | 6/2010 | Jocic | 342/20 |
| 7,982,654 | B2 * | 7/2011 | Low | 342/15 |
| 2006/0164283 | A1 | 7/2006 | Karlsson | |
| 2008/0169959 | A1 * | 7/2008 | Gounalis | 342/20 |
| 2009/0237289 | A1 * | 9/2009 | Stoddard | 342/14 |
| 2010/0283656 | A1 * | 11/2010 | Zavrel et al. | 342/14 |

FOREIGN PATENT DOCUMENTS

WO WO 2007/016641 A2 2/2007

OTHER PUBLICATIONS

De Jong, Coen, Authorized Officer of European Patent Office, Search Report and Written Opinion of International Patent Application PCT/US2010/055909, Dated Dec. 30, 2010.

* cited by examiner

*Primary Examiner* — John B Sotomayor
*Assistant Examiner* — Matthew M Barker
(74) *Attorney, Agent, or Firm* — RatnerPrestia

(57) ABSTRACT

An electronic countermeasure (ECM) transceiver including a receiver for sequentially receiving a plurality of signals in respective frequency sub-bands. A processor sequentially receives the plurality of signals and identifies the received signals as threats. The processor then generates ECM signals based on the threats and sequentially outputs the ECM signals to a transmitter. The transmitter simultaneously transmits the ECM signals in the respective frequency sub-bands to address the threats.

17 Claims, 29 Drawing Sheets

DIGITAL MULTI-CHANNEL ECM TRANSMITTER

FIELD OF THE INVENTION

This invention relates, generally, to a multi-channel electronic counter measure (ECM) system. The ECM system includes a transceiver module for sequentially scanning various sub-bands within a band for threats. The system performs signal processing on the received signals to determine if potential threats exist, identify the type of threats, and then generate appropriate ECM signals to address the threats. In general, the received signals are packetized, and sequentially routed to various processing components in a time domain series of events using a serial rapid IO (SRIO) configuration. The system then demultiplexes the packets and simultaneously transmits a plurality of radio frequency (RF) ECM signals to address the threats in the plurality of sub-bands.

BACKGROUND OF THE INVENTION

In traditional ECM systems, transceivers utilize independent, separate and segregated data streams to identify and process a plurality of received threats. Each transceiver is typically configured with independent processors and data paths to perform ECM. By utilizing independent data paths and independent devices for performing ECM, excess hardware power is consumed. Furthermore, since compromises between functionality and resources are made, the operational bandwidth of the traditional ECM systems tend to be narrow.

SUMMARY OF THE INVENTION

To meet this and other needs, and in view of its purposes, the present invention provides an electronic countermeasure (ECM) transceiver.

In one embodiment, the ECM transceiver includes a receiver for sequentially receiving a plurality of signals in respective frequency sub-bands. A processor sequentially receives the plurality of signals, identifies the received signals as threats, generates ECM signals based on the threats and sequentially outputs the ECM signals. Furthermore, the ECM transceiver includes a transmitter for simultaneously transmitting the ECM signals in the respective frequency sub-bands to address the threats.

The ECM transceiver includes a receive processor for packetizing the received signals and sequentially outputting the received signal packets to the processor. A threat processor sequentially receives the received signal packets, identifies the received signals as threats and sequentially outputs threat identification packets. The ECM transceiver also includes an ECM processor for sequentially receiving the threat identification packets, generating ECM packets based on the threat identification packets and sequentially outputting the ECM packets. A transmit processor converts the sequential ECM packets to parallel ECM signals and frequency multiplexes the parallel ECM signals via complex up-conversion and filtering.

The ECM transceiver includes a packet generator for converting the received signals, and ECM signals into respective sequential packets, a packet switch for sequentially routing the packets between the receiver, processor and transmitter, and a control processor for controlling the receiver, processor and transmitter to perform ECM. A programming interface is also included for programming the receiver, processor, transmitter and control processor.

In one embodiment, an ECM system includes a first transceiver and a second transceiver. Each transceiver in the ECM system includes a receiver for sequentially receiving a plurality of signals in respective frequency sub-bands of a frequency band. A processor sequentially receives the plurality of signals, identifies the received signals as threats, generates ECM signals based on the threats and sequentially outputs the ECM signals. Each transceiver also includes a transmitter for simultaneously transmitting the ECM signals in the respective frequency sub-bands of the frequency band to address the threats. In the system, the frequency band of the first transceiver is different from the frequency band of the second transceiver.

Each transceiver also includes a radio frequency (RF) interface for converting ECM signals to RF frequencies and power levels. A global positioning system (GPS) configures the transceivers based on location, and a computer interface communicates with a host PC. The host PC configures the transceivers to perform ECM operations.

In one embodiment, a method for performing ECM includes a) sequentially receiving a plurality of signals in respective frequency sub-bands, b) identifying the sequentially received signals as threats, generating a plurality of ECM signals based on the identified threats and sequentially outputting the ECM signals, and c) simultaneously transmitting the ECM signals in the respective frequency sub-bands to address the threats.

In one embodiment, steps a-c are repeated in the frequency sub-bands of at least a first frequency band and a second frequency band. In one embodiment, at least a first transceiver and a second transceiver each perform steps a-c in a respective first frequency band and second frequency band.

The ECM method sequentially monitors M frequency sub-bands in a frequency band, and simultaneously, in a first time period, transmits N ECM signals in N of the M frequency sub-bands, where N and M are integers. The ECM method simultaneously, in at least a second time period following the first time period, transmits at least another N ECM signals in at least another N frequency sub-bands. M threats are addressed by transmitting M ECM signals N at a time over P successive time periods, wherein $M=N*P$ and M, N and P are integers.

Also, the received signals and ECM signals are converted into respective sequential packets, and sequentially routed between the receiver, processor and transmitter. In general, the receiver, processor and transmitter are programmed to perform various ECM processes.

It is understood that the foregoing general description and the following details are exemplary, but are not restrictive of the invention.

DETAILED DESCRIPTION OF THE INVENTION

As will be described, the present invention provides an electronic countermeasures (ECM) system for sequentially monitoring sub-bands of an overall band for identifying radio frequency (RF) threat signals. The present invention packetizes and sequentially routes the plurality of RF signals to various signal processing components to identify the threats. The system then simultaneously transmits a plurality of appropriate ECM signals to address the identified threats.

For example, a transceiver in the ECM system sequentially monitors (in time) a plurality of sub-bands. The RF signals received when monitoring the plurality of sub-bands are packetized and sequentially routed to various signal processing and storage elements via serial rapid IO (SRIO) protocol. Signal processing is performed on the packets to identify if the received signals are threat signals which may be RF signals used in electronic warfare. If the RF signals are identified as a threat, the system generates an appropriate ECM signal to address the threat. Each transceiver in the ECM system may simultaneously transmit independent ECM signals in independent sub-bands within its respective band. The system then sequentially switches to other sub-bands within the band, and simultaneously transmits other ECM signals. Each sub-band within the band can be monitored and addressed in time division multiplex manner (e.g. up to 6 sub-bands addressed simultaneously for up to 5 time periods to cover up to a total of 30 sub-bands).

Figure 1A:
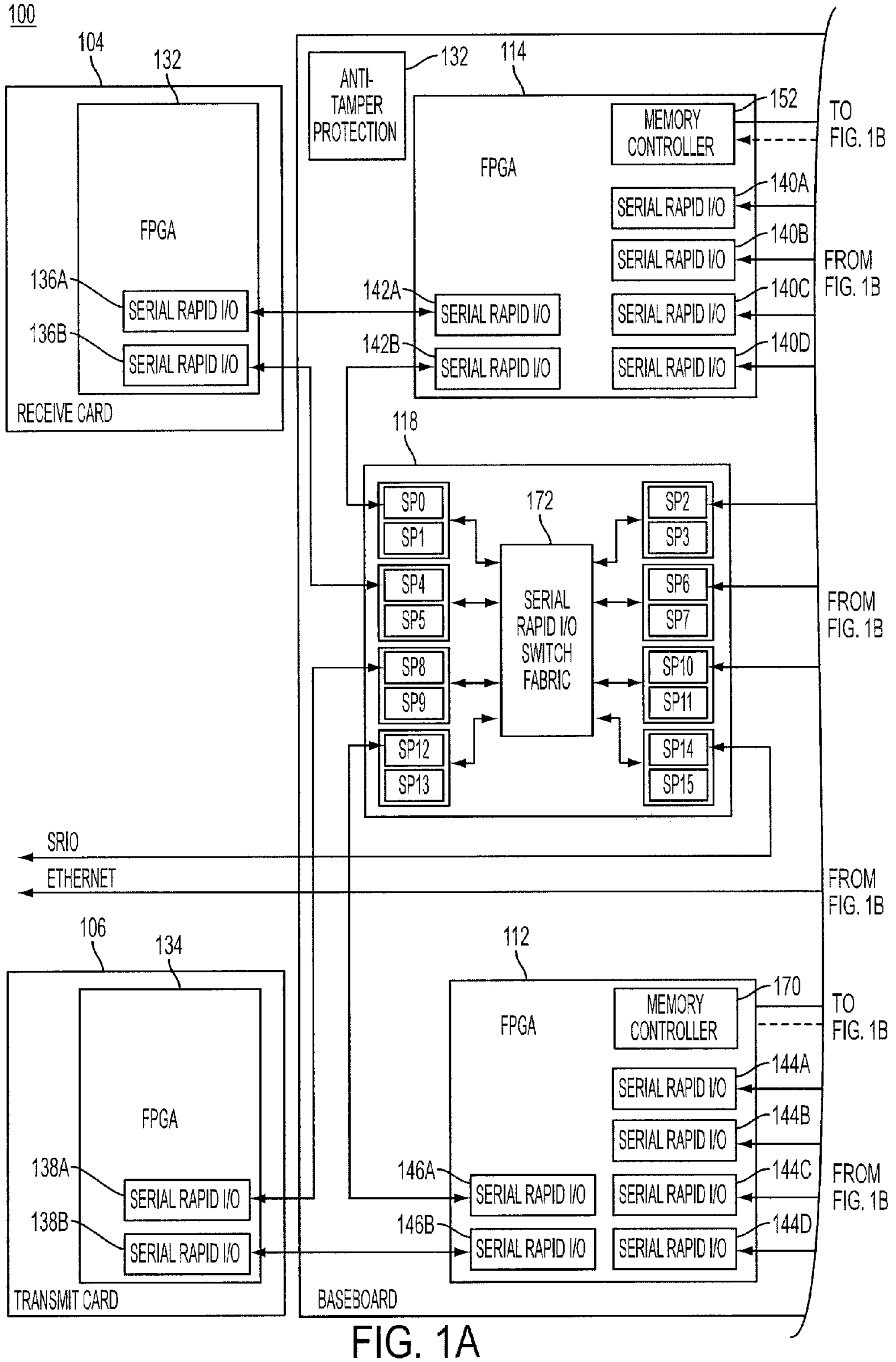
FIG. 1 is a block diagram of a transceiver module for an ECM system, according to an embodiment of the present invention.
Figure 1B:
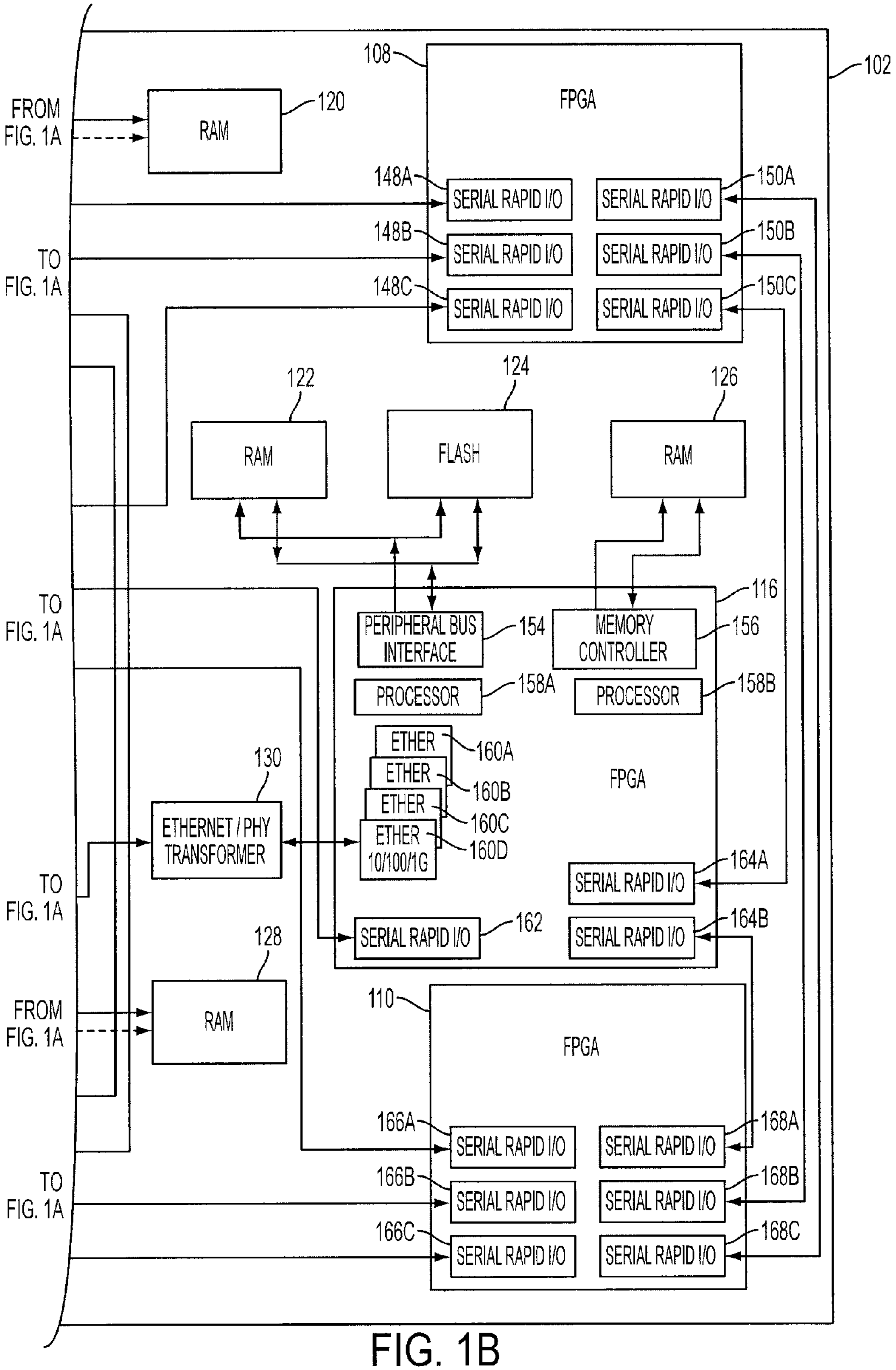

In one embodiment, FIG. 1 shows transceiver module 100 configured for a particular band. Transceiver module 100 includes receive card 104 for sequentially scanning a plurality of sub-bands within the band. Receive card 104 includes FPGA 132 for processing the received RF signals and SRIO modules 136(*a*) and 136(*b*) for packetizing the received signals. The SRIO modules may be configured to accommodate four lanes of data.

Transceiver module 100 also includes baseboard 102 for processing the packets. On the reception processing side, the SRIO packets from FPGA 132 are sequentially sent to FPGA 114 for threat processing. FPGA 114 includes SRIO modules 142*a*, 142*b* and 140*a*-140*d* for inputting and outputting the packets. FPGA 114 may be configured to process the incoming received packets and perform threat identification with the support of memory controller 152 and RAM 120. FPGA 114 may also utilize support FPGA 108 which has additional signal processing capabilities that may support threat identification. Support FPGA 114 includes SRIO modules 148*a*-148*c* and 150*a*-150*c*. On the transmission processing side, baseboard 102 includes FPGA 112 and support FPGA 110. Specifically, FPGA 112 includes SRIO modules 146*a*, 146*b* and 144*a*-144*d*, memory controller 112 and RAM 128.

In operation, after the threats are detected by FPGA 114, FPGA 112 with the optional aid of FPGA 110 then compute ECM signals to be transmitted for addressing the threats. Thus, FPGAs 114 and 108 are configured to identify received threats, while FPGAs 112 and 110 are configured to generate ECM signals to address the identified threats.

In general, the processing performed by FPGAs 114, 108, 112 and 110 are coordinated by control FPGA 116 which includes peripheral bus interface 154, memory controller 156, processors 158*a* and 158*b*, Ethernet modules 160*a*-160*d* and SRIO modules 162, 164*a* and 164*b*. Control FPGA 116 is also supported by various memory devices such as RAM 122, Flash 124 and RAM 126. The control FPGA 106 functionality and overall transceiver functionality may communicate with other devices such as a personal computer (PC) over an Ethernet line via Ethernet module 130.

Furthermore, baseboard 102 includes SRIO switch 118 having switch fabric 172 and switch inputs/outputs SP0-SP15. Switch 118 is configured to sequentially route the data packets to the various signal processing and storage components on baseboard 102, receive card 104 and transmit card 106 under the control of FPGA 116.

Figure 2A:
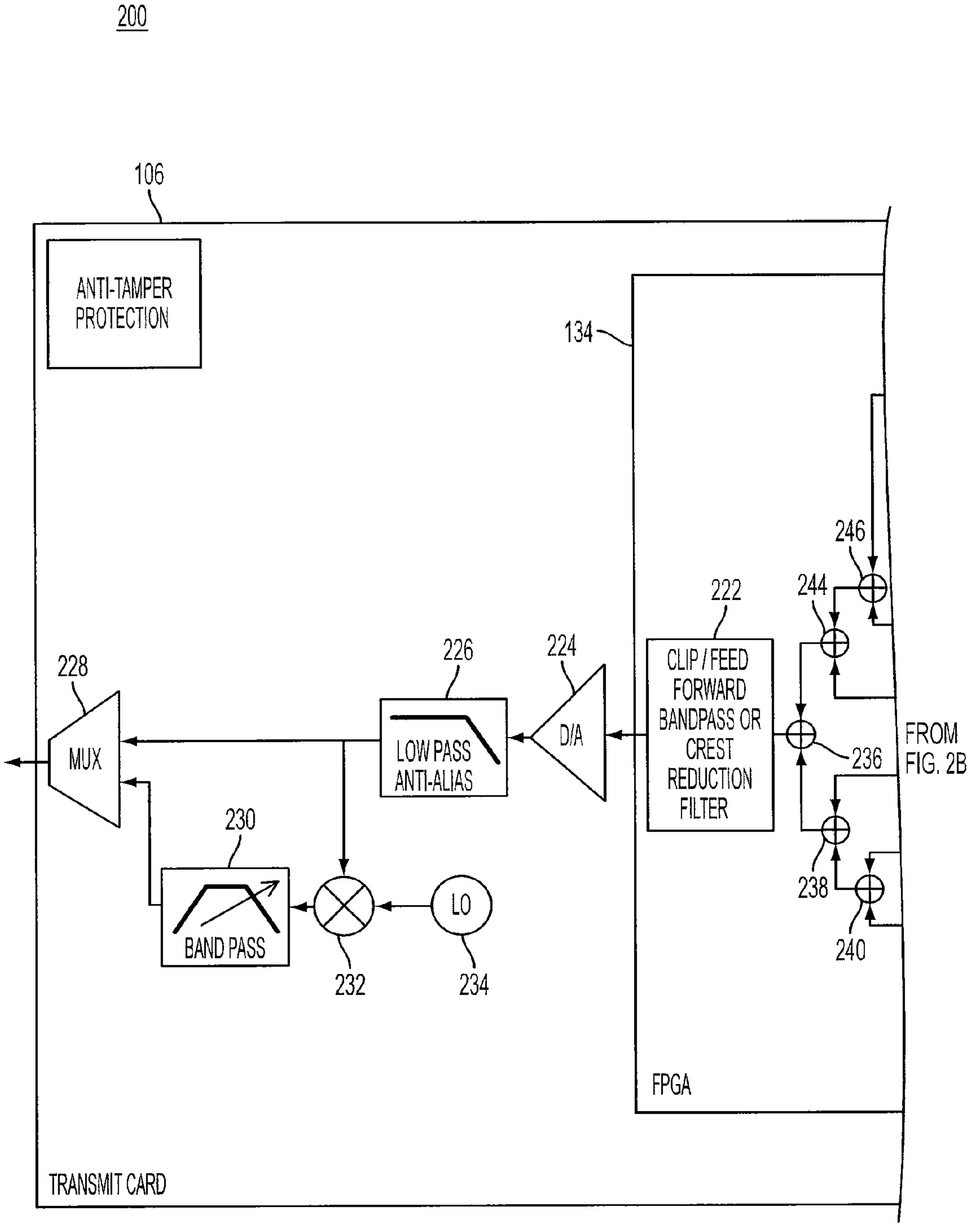
FIG. 2 is a block diagram of a single channel transmit card in the transceiver module of FIG. 1, according to an embodiment of the present invention.
Figure 2B:
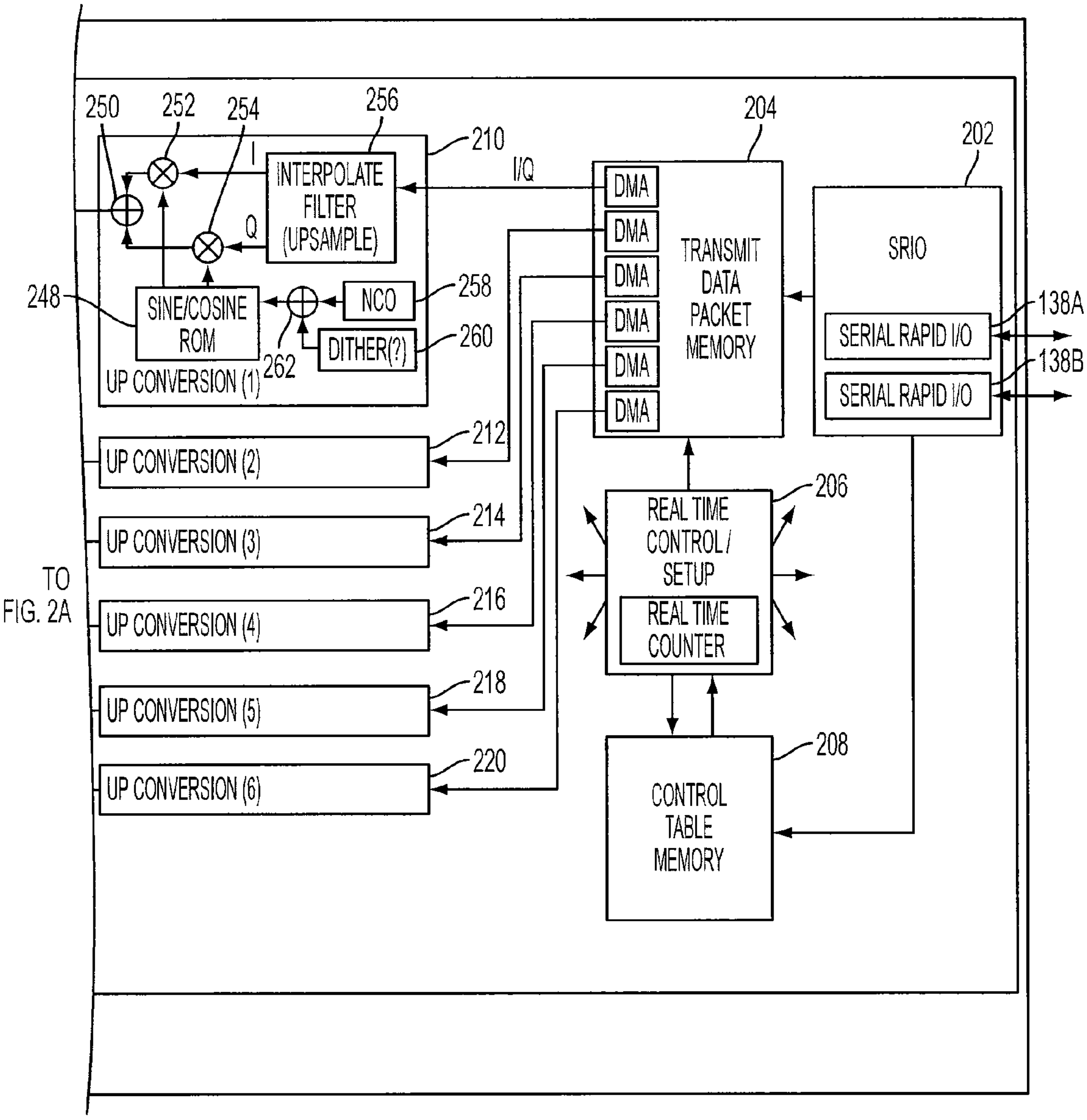
Figure 3A:
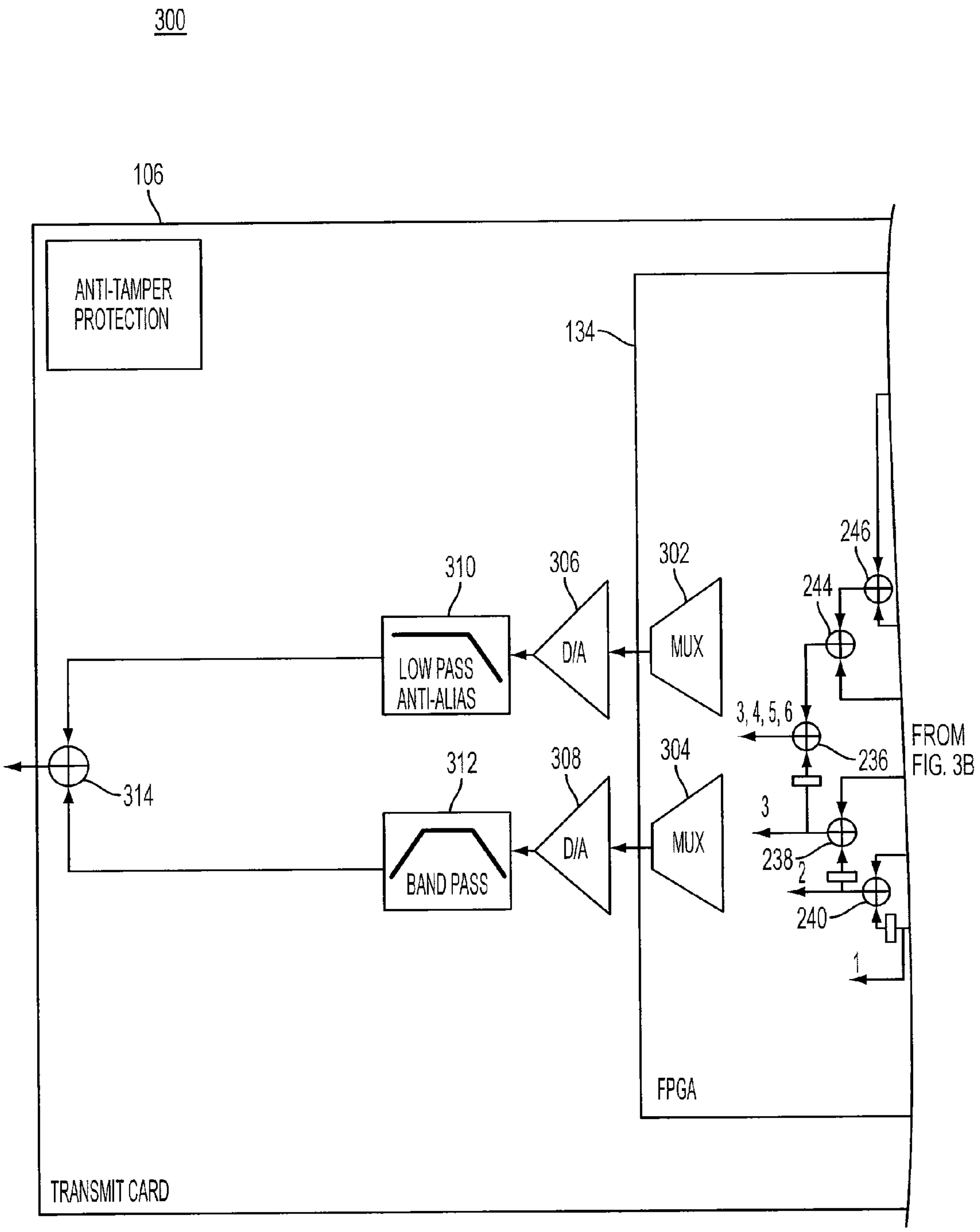
FIG. 3 is a block diagram of a dual channel (low/high) transmit card in the transceiver module of FIG. 1, according to an embodiment of the present invention.
Figure 3B:
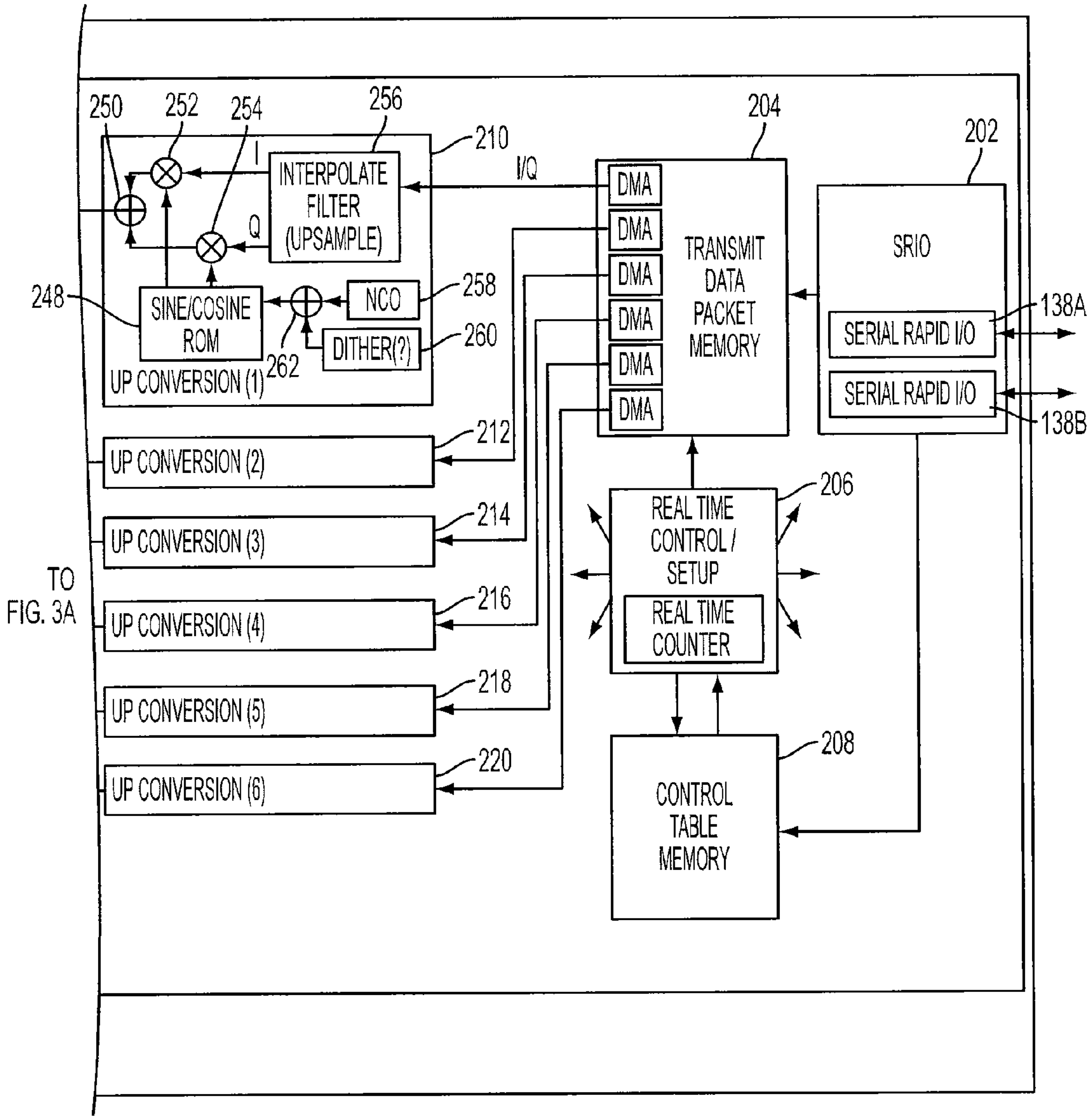
Figure 4A:
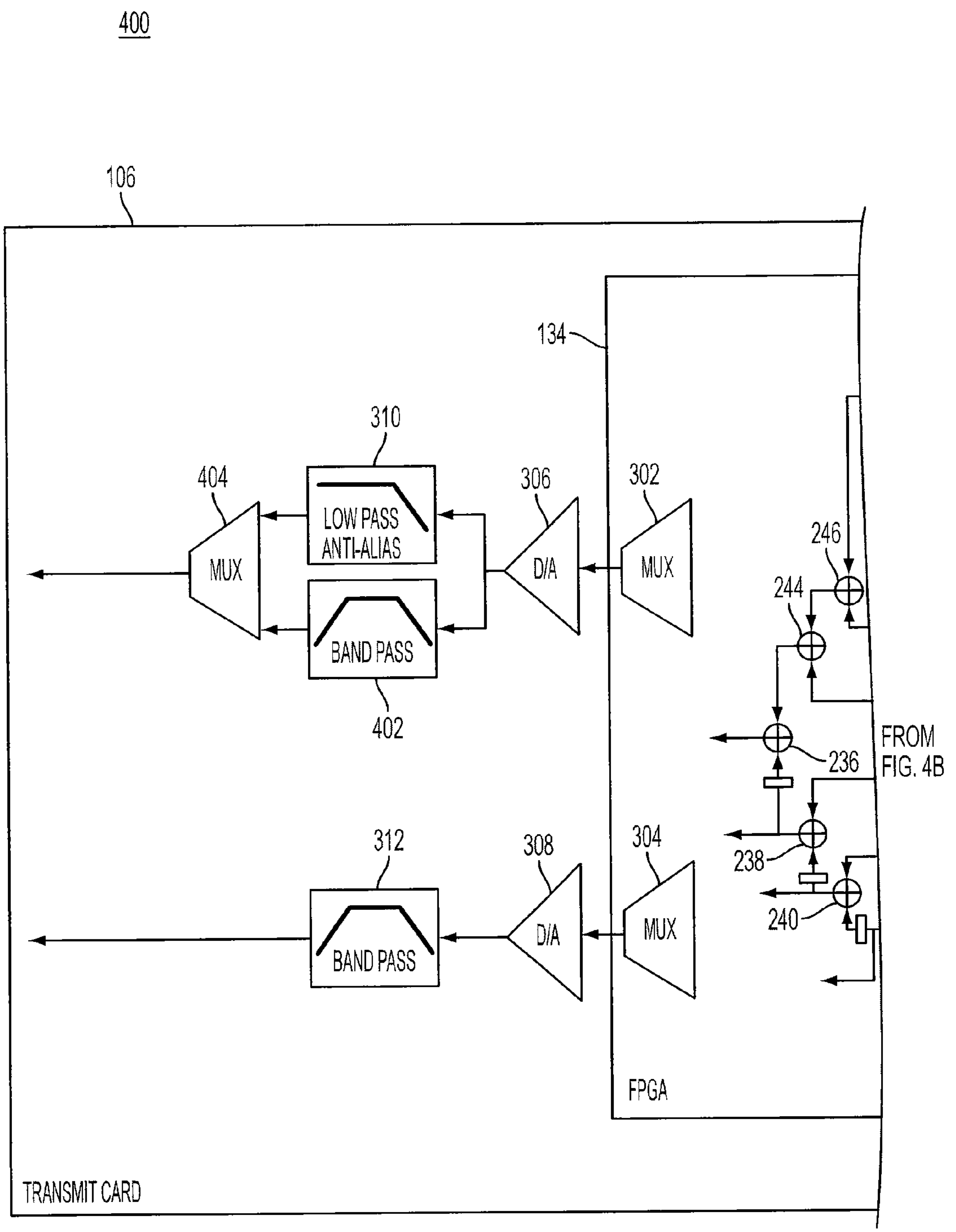
FIG. 4 is a block diagram of a selective dual channel (low/high) or (high/high) transmit card in the transceiver module of FIG. 1, according to an embodiment of the present invention.
Figure 4B:
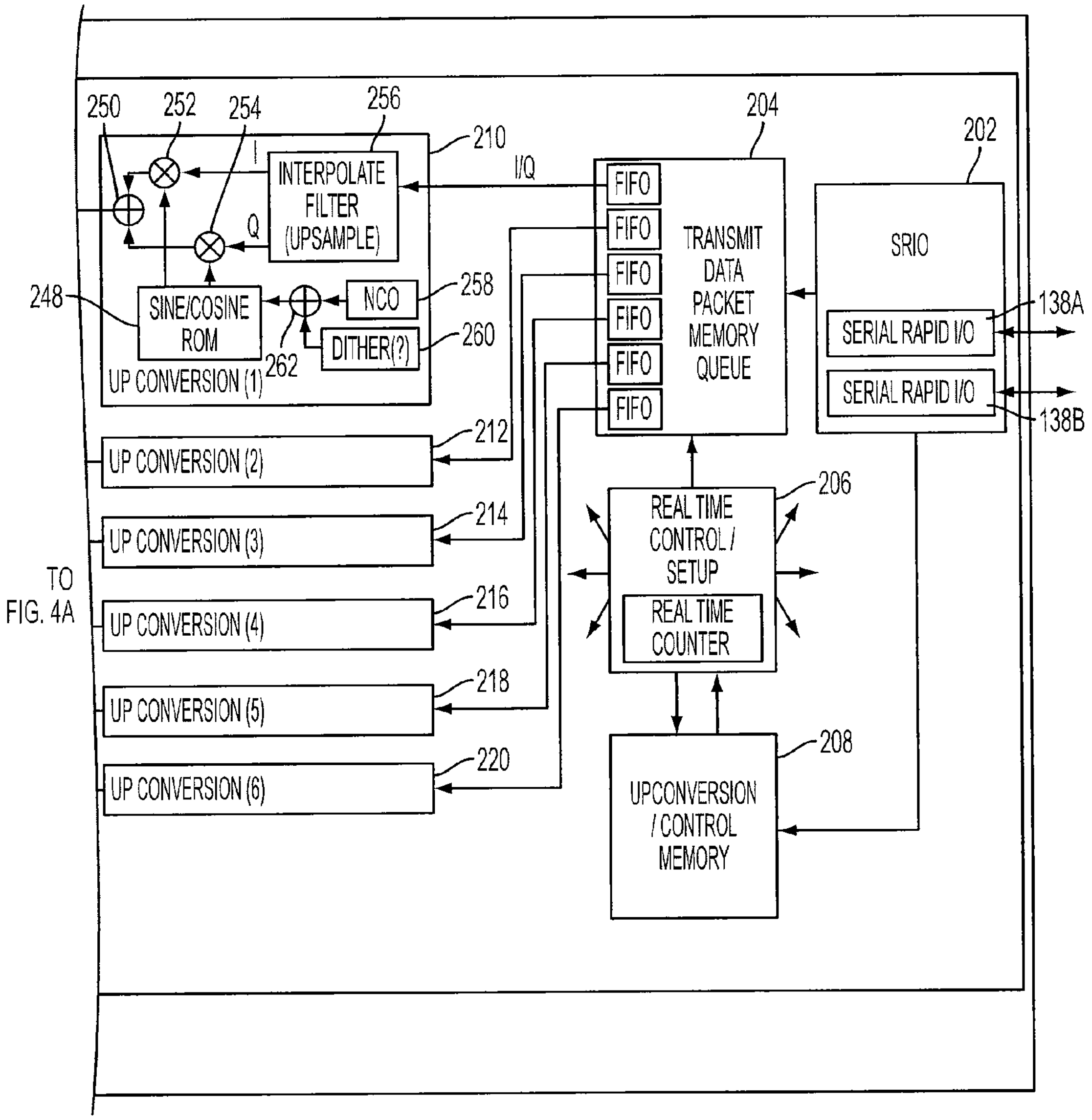

Shown in FIGS. 2-4, are three embodiments of transmit card 106 shown in FIG. 1. In FIG. 2, transmit card 106 is configured as a single channel (single output) system 200 (either a low pass channel or a high pass channel). FPGA 134 includes transmit data packet memory 204 for converting the serial data packets into parallel data, real time control set up 206 and control table memory 208 for controlling the timing of the packets. In this embodiment, the data is parallelized into six data paths where six ECM signals are digitally up converted by up converters 210, 212, 214, 216, 218 and 220. In general, the up converters include up sampler 256, oscillator 258, dither module 260, adders 250 through 262, sine/cosine ROM 248 and modulators 252 and 254. The ECM signals are first digitally up sampled and then the in-phase and quadrature components are separately modulated by a digital sinusoids. The in-phase and quadrature components are then summed together by adder 250 and all six ECM signals are added together (frequency multiplexed) via adders 236, 238, 240, 244 and 246. Thus, six ECM signals are frequency multiplexed so that six threats may be addressed in six sub-bands simultaneously. The frequency multiplexed signals are then filtered by filter 222, converted from digital to analog through D/A 224 and low pass filtered by filter 226. The low pass signal is then either directly output through multiplexer 228 or modulated by with local oscillator 234 via modulator 232, and then band pass filtered by filter 230. Multiplexor 228 may then select either the low pass channel or the high pass channel.

In another embodiment, transmit card 106 may be configured as dual channel system 300 (multiplexed low pass channel and high pass channel). Specifically, the dual channel system is similar to the single channel system in FIG. 2 with the exception of multiplexers 302 and 304, D/A converters 306 and 308, low pass filter 310, band pass filter 312 and adder 314. The frequency multiplexed signals output from the up converters 210-220 and adders 236, 238, 240, 244 and 246 may be sent to multiplexer 302 and multiplexer 304. Thus, the six frequency multiplexed signals are broken up into a low pass channel and a high pass channel. The two channels are then added together via adder 314 to produce an output having both a low pass ECM channel and a high pass ECM channel.

In yet another embodiment, transmit card 106 may be configured as a selective dual channel system 400 (low pass and high pass) or (high pass and high pass). Specifically, one channel may include multiplexer 302, D/A 306, low pass filter 310, band pass filter 402 and multiplexer 404. This particular configuration allows for a dual channel system that may selectively output two separate channels such as a low and high pass channel or dual high pass channel. It is also understood that the outputs of up converters 210-220 and adders 236-240, 244 and 246 may be connected to the multiplexers in various configurations.

Figure 5:
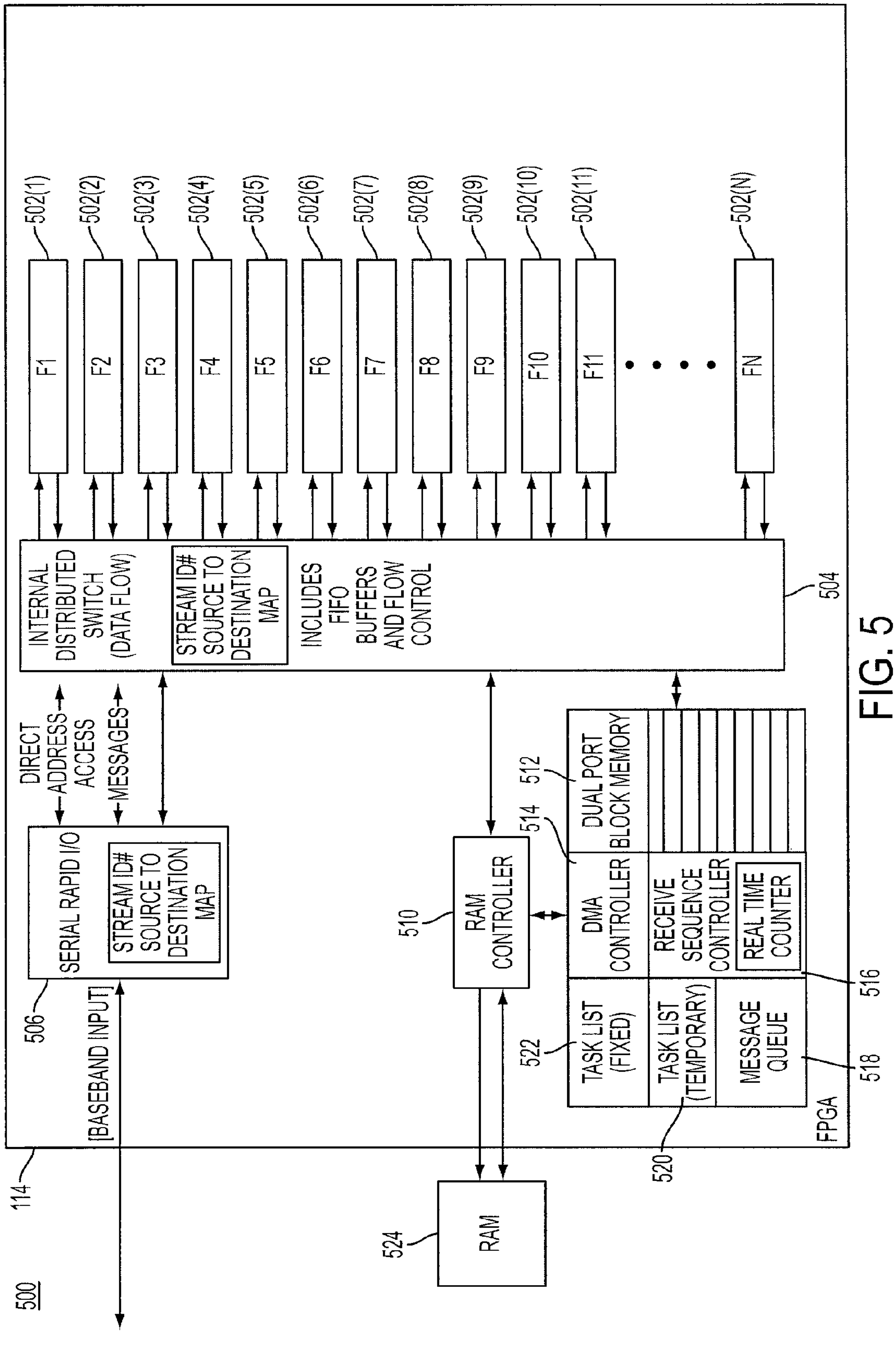
FIG. 5 is a block diagram of a received signal processing module in the transceiver module of FIG. 1, according to an embodiment of the present invention.

FIG. 5 shows system 500 as an embodiment of FPGA 114 shown in FIG. 1. In this embodiment, receive signal processor 114 includes SRIO module 506, internal distribution switch 504, RAM controller 510, DMA controller 514, dual port block memory 512, receive sequence controller 516, message queue 518, temporary task list 520 and fixed task list 522. FPGA 114 also includes a plurality of functions F1 502(1)-FN 502(N) for operating on the data packets and performing threat identification. Specifically, the incoming packets are routed by 504 to various functions F1-FN for threat identification processing. The functions may be configured to perform windowing, fast Fourier transform (FFT), amplitude/phase computations, and other operations for threat identification. The routing and processing of packets is performed according to the fixed tasks of list 522 and the temporary tasks of list 520 with the support of block memory 512 and RAM 524. Thus, as packets are sequentially received, they are processed to identify threats. Once the threats are identified, FPGA 114 outputs threat identification signals via SRIO module 506 to FPGAs 112 and 110 for ECM generation.

Figure 6:
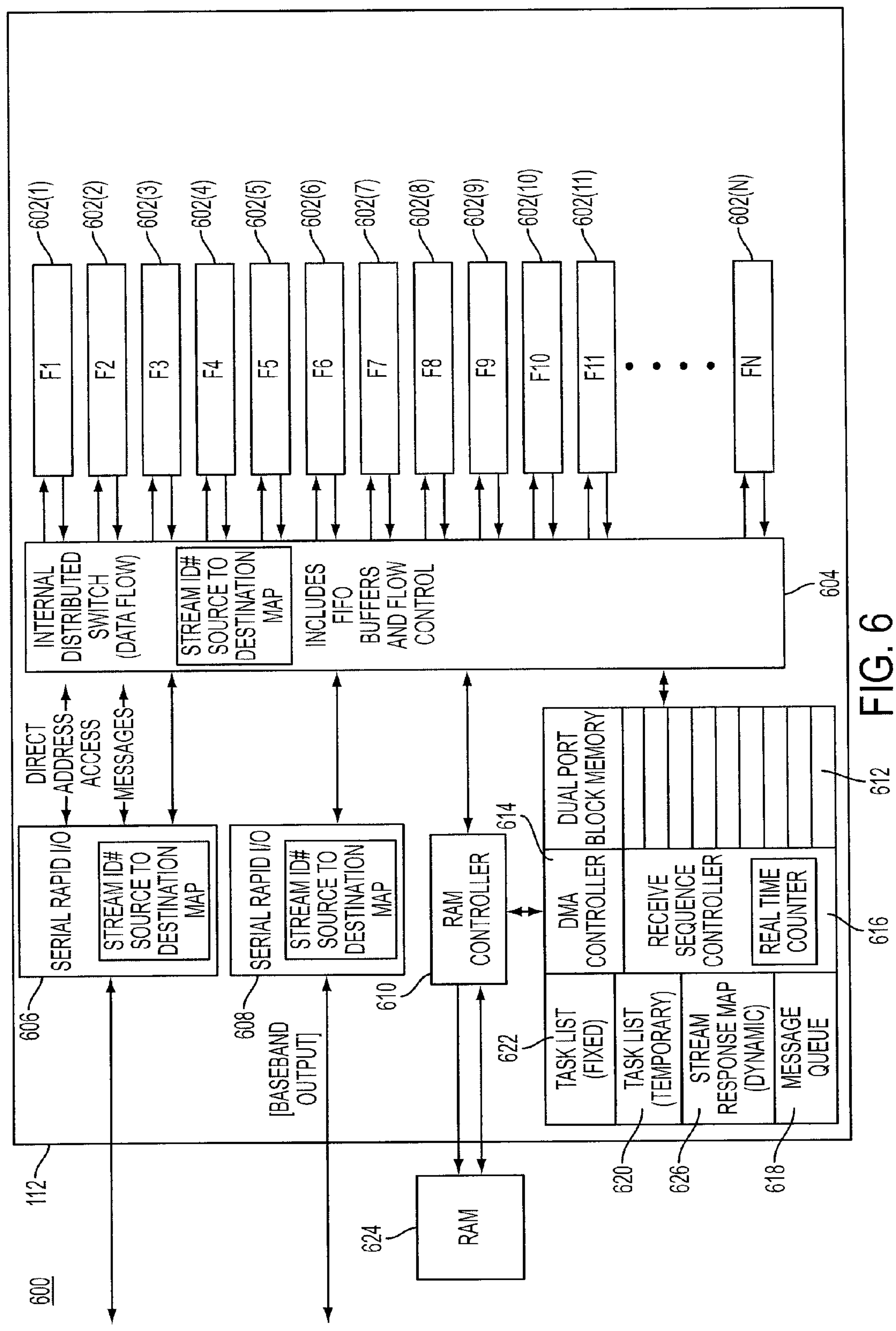
FIG. 6 is a block diagram of a transmit signal processing module in the transceiver module of FIG. 1, according to an embodiment of the present invention.

An embodiment of ECM FPGA 112 in FIG. 1 is shown as system 600 in FIG. 6. Specifically, FPGA 112 includes SRIO modules 606 and 608, switch 604, function modules 602(1)-602(N), RAM controller 610, block memory 612, transmit sequence controller 616, message queue 618, stream ID response map 626, temporary task list 620, fixed task list 622 and RAM 624. F1-FN for the transmit signal processor may be configured to perform IFFT, filtering, modulation, up sampling/up converting and other ECM generation operations. In general, FPGA 112 receives the threat identification signals from FPGA 114 and then generates ECM signals. FPGA 112 then transmits the ECM signals to transmit card FPGA 134 where the ECM signals are up converted and multiplexed.

Figure 7A:
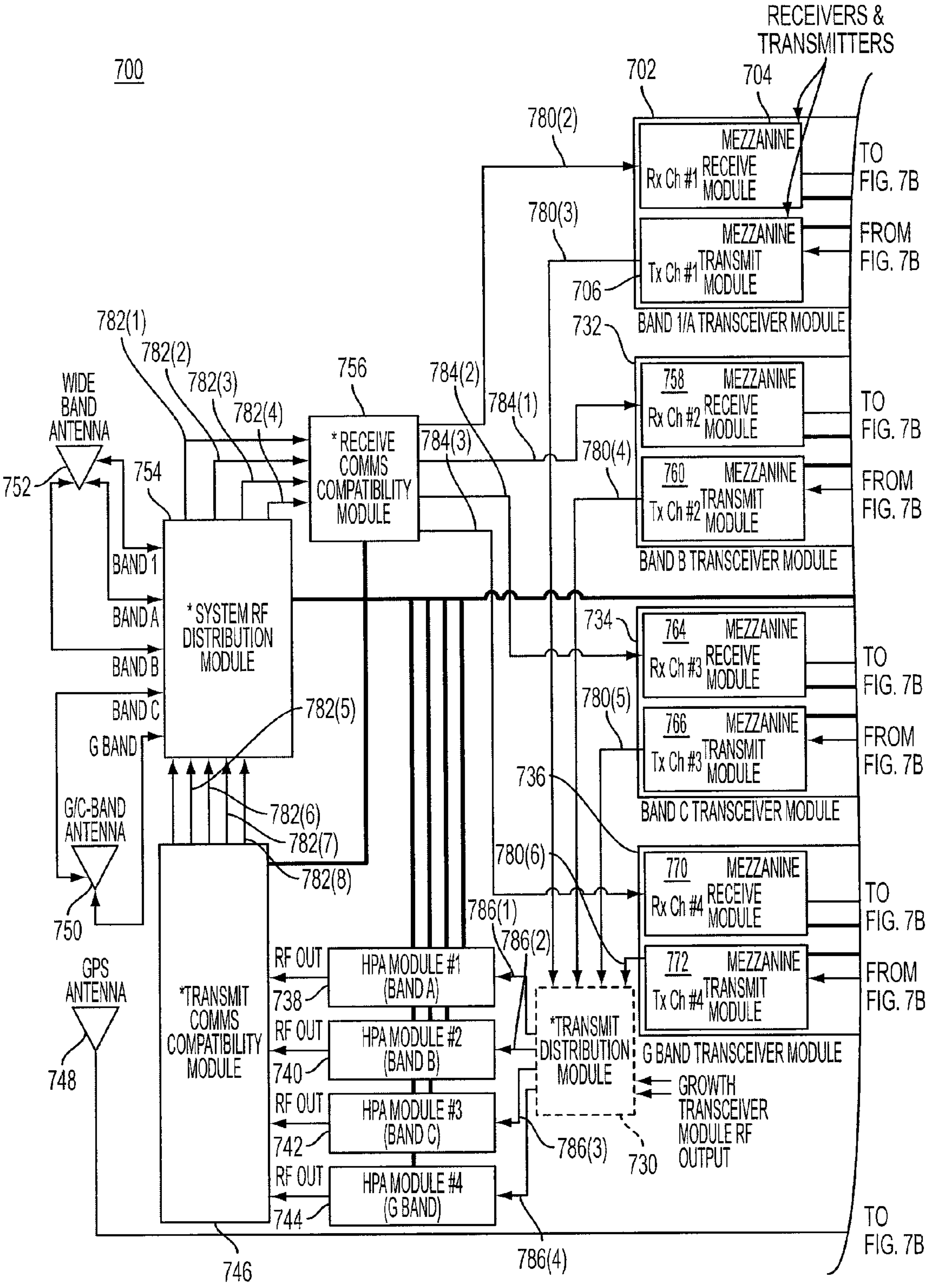
FIG. 7 is a block diagram of a vehicle mounted ECM system, according to an embodiment of the present invention.
Figure 7B:
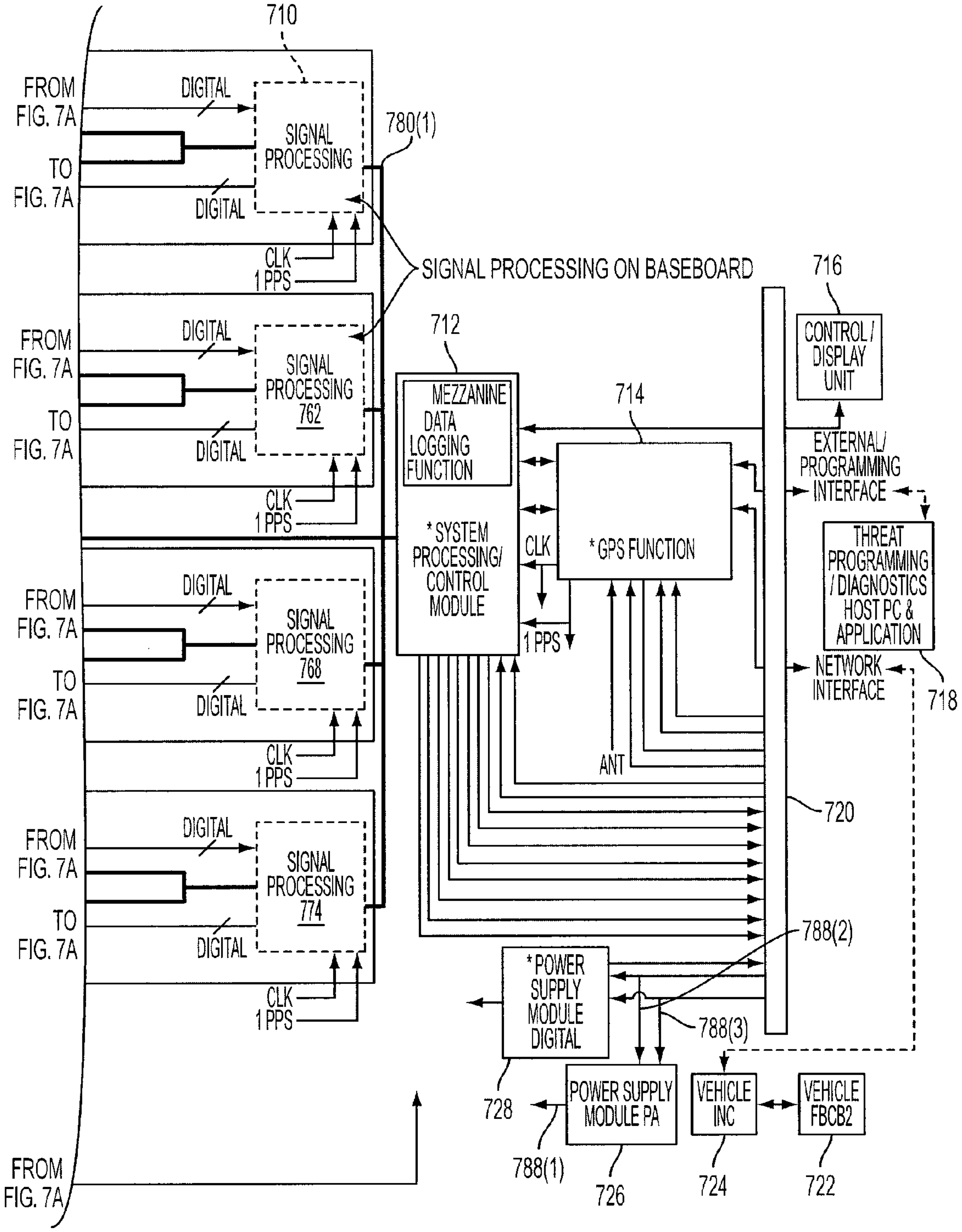

Transceiver module 100 as shown in FIG. 1 may be utilized in an overall ECM system wherein a plurality of bands are simultaneously monitored for threats. Specifically, as shown in FIG. 7, mounted ECM system 700 (e.g. mounted on a vehicle) includes a plurality of transceiver modules 702, 732, 734 and 736. Each transceiver module monitors a particular band where threats may exist (e.g. Band 1/A, Band B, Band C and Band G). Each of these bands may be predetermined as known threat bands. Thus, including a plurality of transceiver modules to cover each threat band may be beneficial. It is noted that bands other than 1/A, B, C and G may be monitored.

In FIG. 7, mounted ECM system 700 includes band 1A transceiver module 702, band B transceiver module 732, band C transceiver module 734 and band G transceiver module 736. Each transceiver module includes respective receive modules 704, 758, 764 and 770, respective transmit modules 706, 760, 766 and 772, and respective signal processing modules 710, 762, 768 and 774. In general, each of the transceiver modules in FIG. 7 may be configured similar to transceiver module 100 shown in FIG. 1. To support the functionality of the transceiver modules, the mounted ECM system also includes an analog RF section having a receive communication compatibility module 756, transmit distribution module 730, power amplifier modules 738, 740, 742 and 744, transmit compatibility module 746, RF distribution module 754, and antennas 748, 750 and 752. The mounted ECM system may also include a processing control module 712 which includes a data logging function, a GPS module 714, power supply modules 726 and 728, vehicle modules 722 and 724 or interfacing to the vehicle processor, control display unit 716, threat diagnostic application 718 running on a PC and data bus 720.

Figure 8:
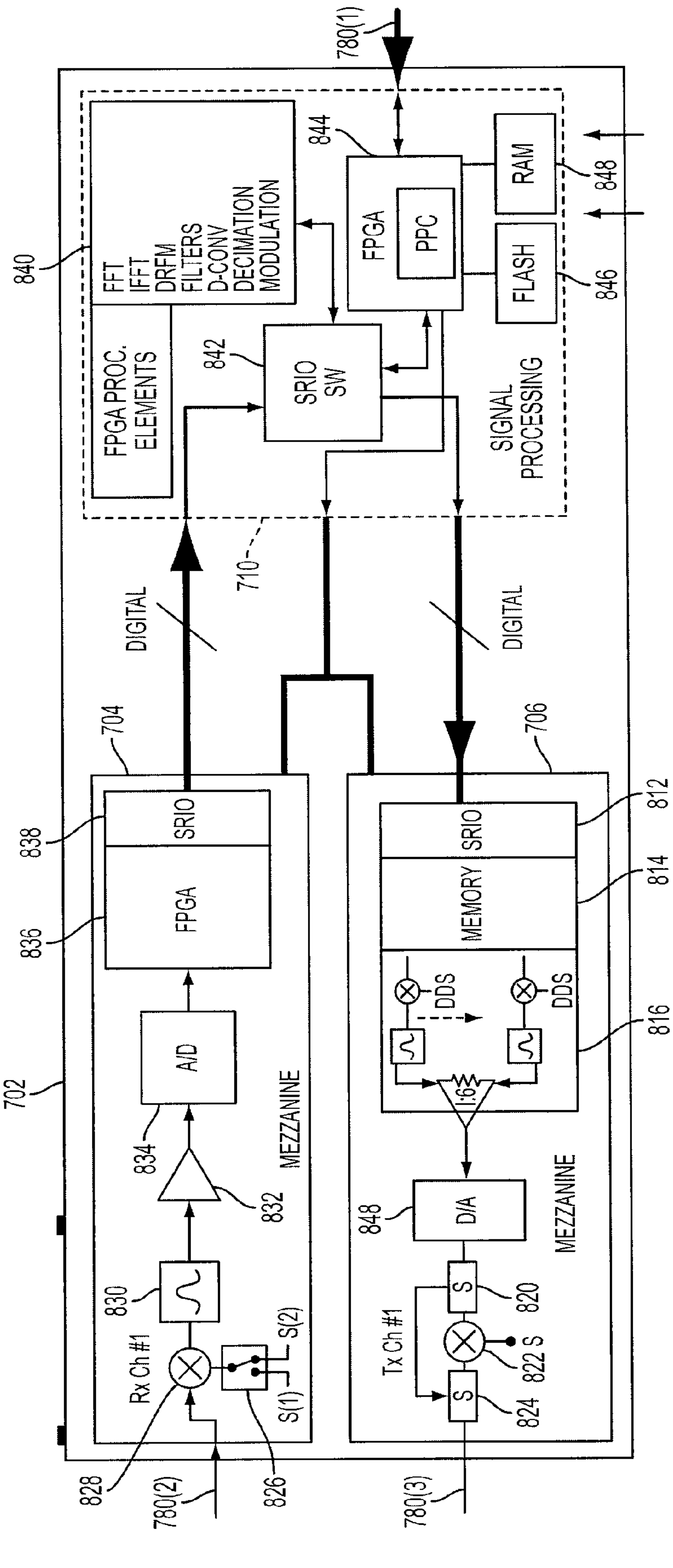
FIG. 8 is a block diagram of a transceiver module for the vehicle mounted ECM system in FIG. 7, according to an embodiment of the present invention.

FIG. 8 shows an embodiment of transceiver module 702. Specifically, receive card 704 in this embodiment includes switch 826 for selecting local oscillator signals, modulator 828, filter 830, amplifier 832, A/D 834, FPGA 836 and SRIO 838. The transmit card 706 includes switches 820 and 824 for bypassing modulator 822, D/A 818, modulator/multiplexer 816 for frequency multiplexing the six ECM signals, memory 814 and SRIO 812. Furthermore, base board 710 includes FPGA processing functions 840, SRIO switch 842, FPGA 844, flash memory 846, and RAM 848. Transceiver 702 also includes input/output lines 780(1)-780(3). The general operation of the transceiver module in FIG. 8 has already been described in reference to FIGS. 1-6.

Figure 9:
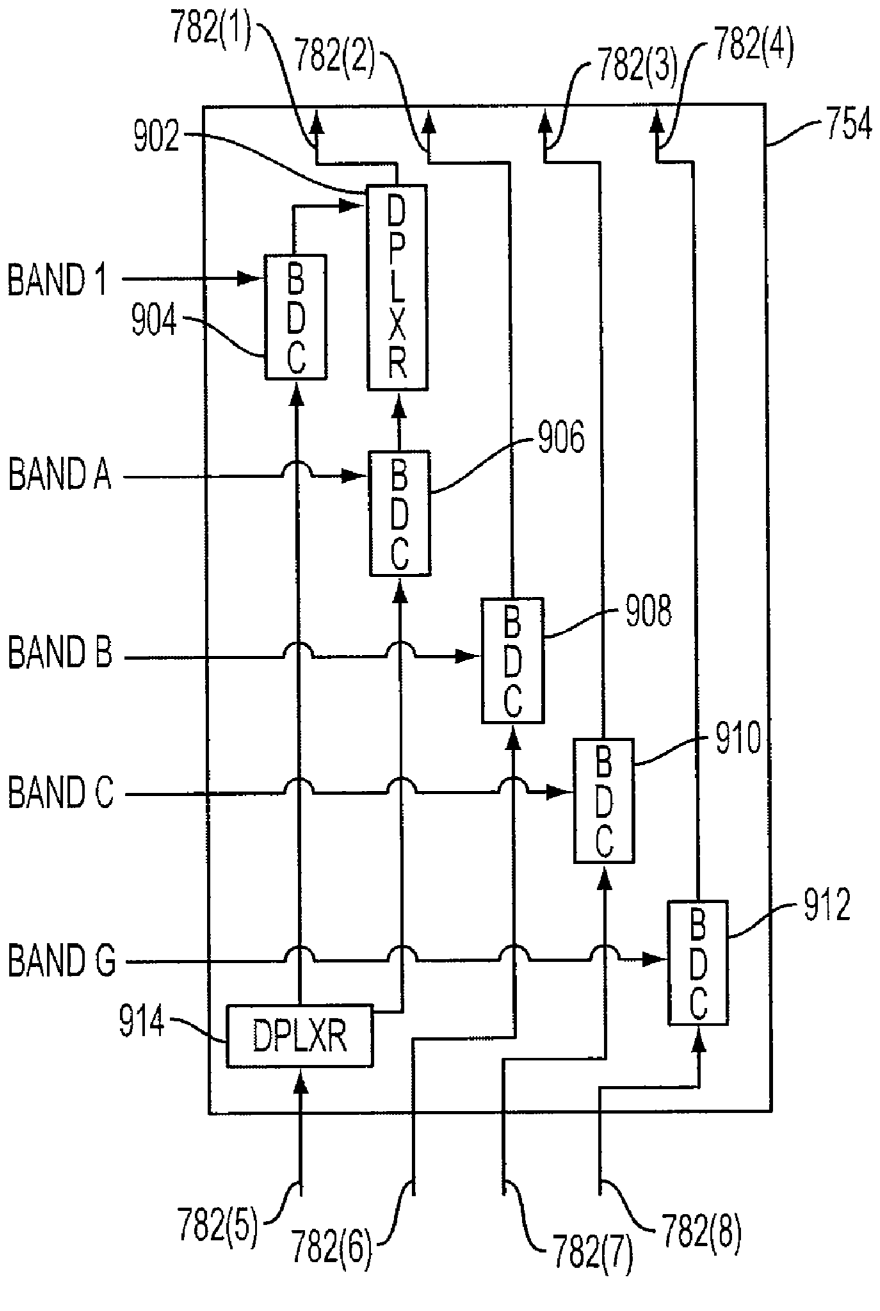
FIG. 9 is a block diagram of a radio frequency distribution module for the vehicle mounted ECM system in FIG. 7, according to an embodiment of the present invention.

FIG. 9 shows RF distribution module 754 which couples and routes the RF signals received via antennas 748, 750 and 752. Module 754 includes bi-directional couplers (BDC), 904, 906, 908, 910 and 912 that serve as RF routers of RF to the system receivers from the antennas as well as RF routers to the antennas from the system power amplifier functions. Module 754 also includes diplexers 902 and 914 that perform frequency domain multiplexing on the signals. In general, RF distribution module 754 communicates with other modules in system 700 via input/output lines 782(1)-782(8).

Figure 10:
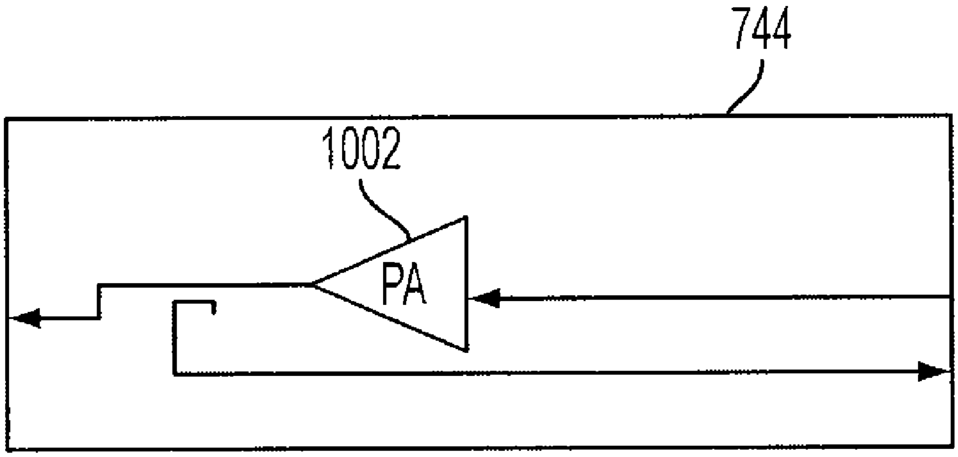
FIG. 10 is a block diagram of a power amplification module for the vehicle mounted ECM system in FIG. 7, according to an embodiment of the present invention.

FIG. 10 shows an embodiment of power amplifier module 744. Specifically, the power amplifier module includes power amplifier 1002 for amplifying the signals output from transceiver 736 to RF transmission power levels. The other amplifier modules for bands A, B and C are similar to the band G module 744 shown in FIG. 10.

Figure 11:
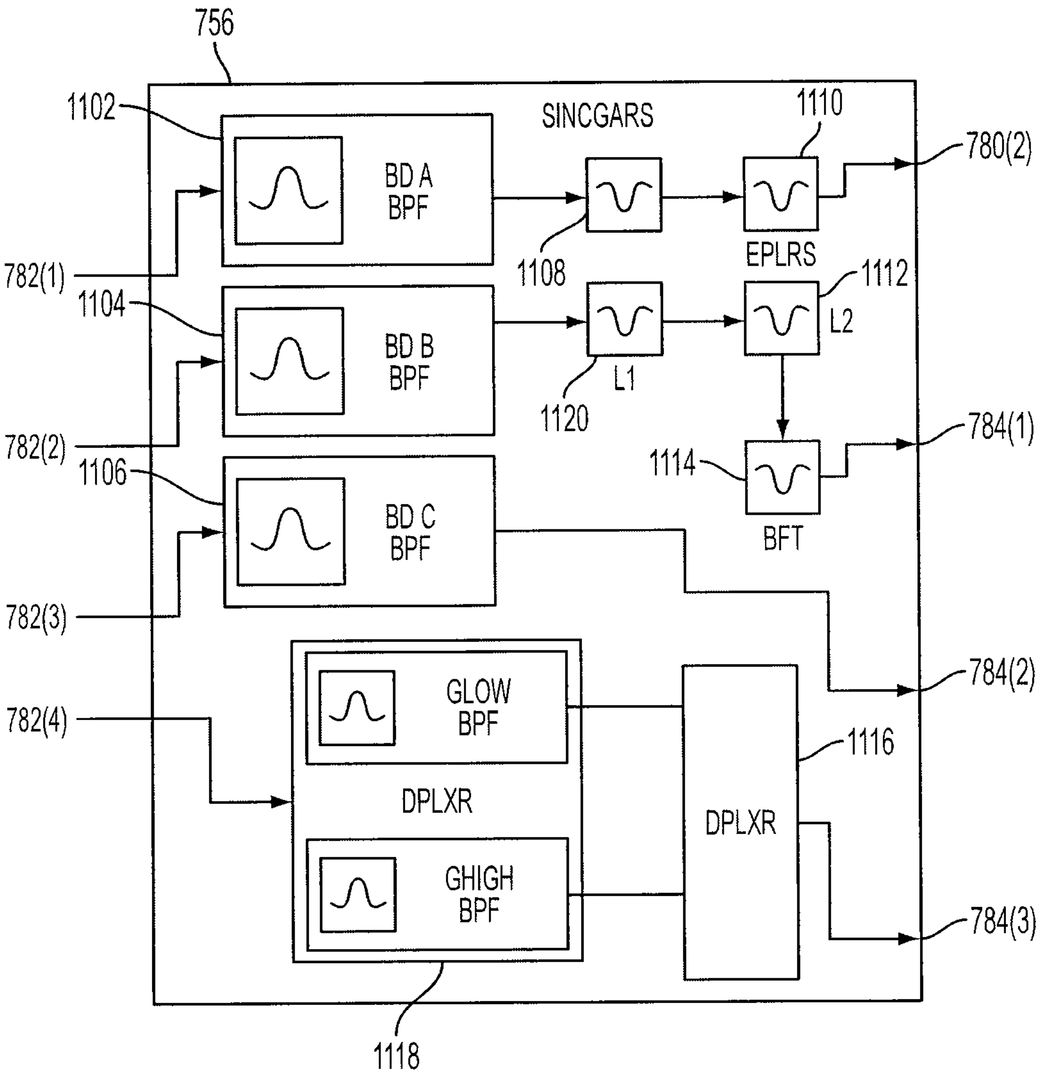
FIG. 11 is a block diagram of a multi-transceiver type receive compatible module for the vehicle mounted ECM system in FIG. 7, according to an embodiment of the present invention.
Figure 12:
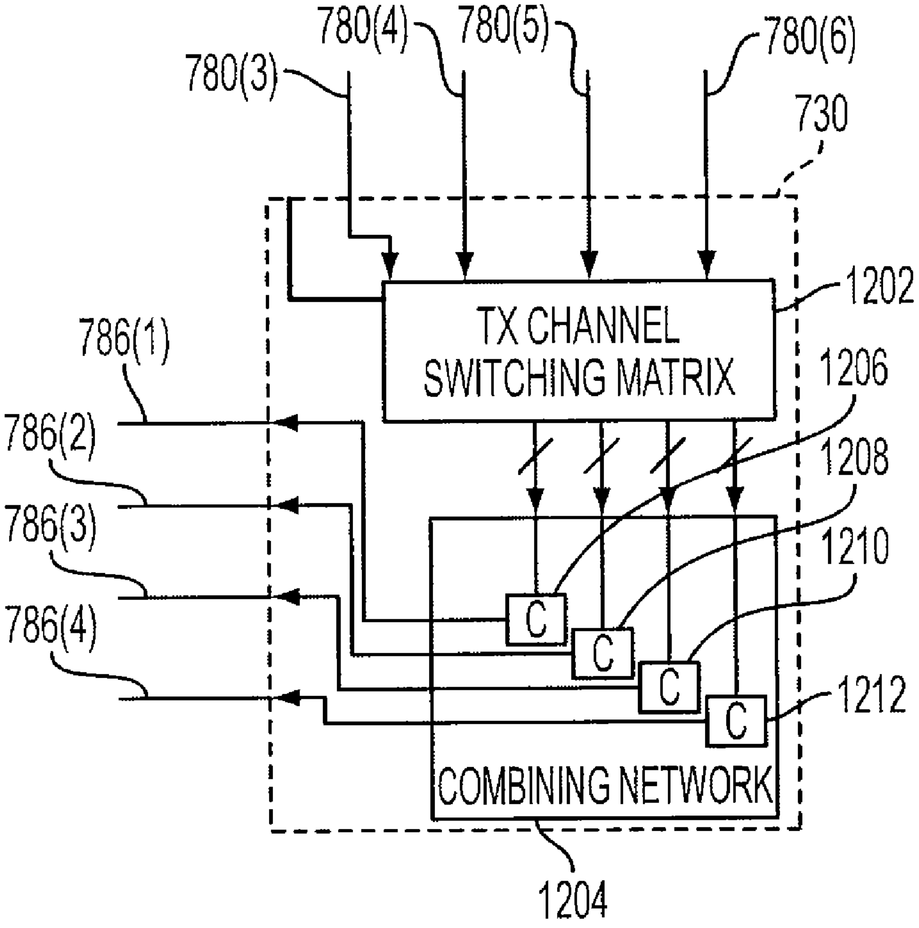
FIG. 12 is a block diagram of a multi-transceiver type transmit distribution module for the vehicle mounted ECM system in FIG. 7, according to an embodiment of the present invention.

FIG. 11 shows receive compatibility module 756 configured for a multi-transceiver type system (e.g. the band C transceiver is tunable to frequency range different than the other transceivers). Module 756 includes band pass filters 1102, 1104 and 1106 for band A, band B, and band C respectively. Also included is module 1118 which includes a band pass filter for the low frequency side of the G band (Glow) and a band pass filter for the high frequency side of G band (Ghigh). Diplexer 1116 is also included to multiplex Glow and Ghigh of the G band. Furthermore, band stop filters 1108, 1110, 1112, 1114 and 1120 are included for rejecting certain frequencies within the band. In general, module 756 communicates with the other modules in system 700 via input/output lines 782(1)-784(4), 780(2) and 784(1)-784(3).

Also included in system 700 is transmit distribution module 730 for the multi-transceiver type system. Transmit distribution module 730 includes a switching matrix 1202 and a combining network 1204 including combiners 1206, 1208, 1210, and 1212 for combining a plurality of lines output by the switching matrix into a single line. In general, module 730 communicates with the other modules in system 700 via input/output lines 780(3)-780(6) and 786(1)-786(4).

Figure 13:
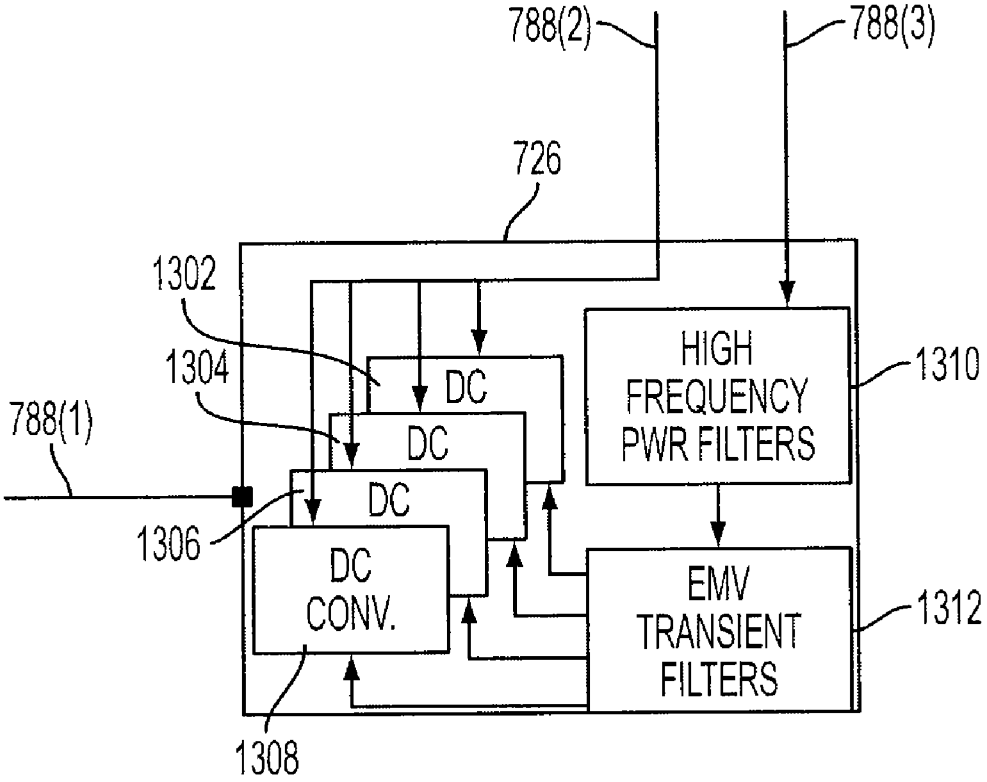
FIG. 13 is a block diagram of a of a power supply module for the vehicle mounted ECM system in FIG. 7, according to an embodiment of the present invention.

Power supply module 726 of system 700 is also shown in FIG. 13. Specifically, the power supply module includes DC converters 1302, 1304, 1306 and 1308, high frequency power filters 1310 and EMI transient filters 1312. In general, power supply modules 726 and 728 provide power for analog and digital components in the system 700. Power supply module 726 receives and supplies power to the other modules in system 700 via input/output lines 788(1)-788(3).

Figure 14:
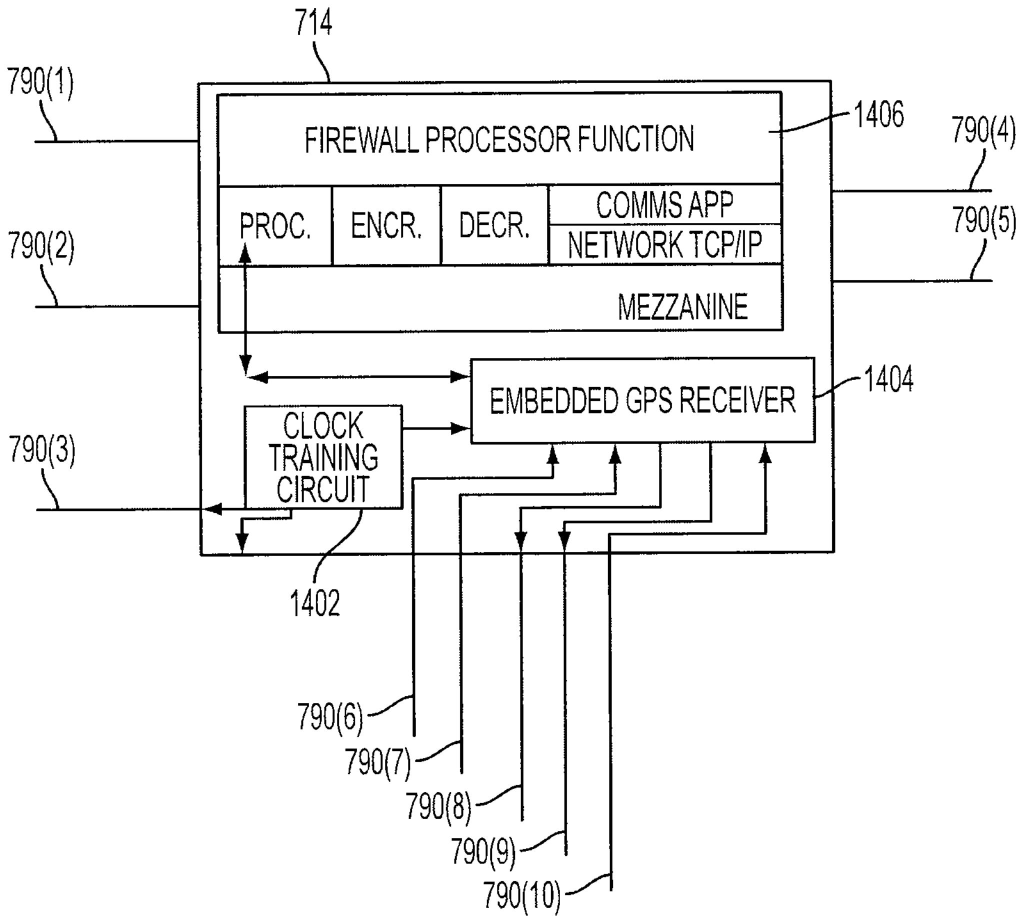
FIG. 14 is a block diagram of an ECM system firewall and global positioning system module for the vehicle mounted ECM system in FIG. 7, according to an embodiment of the present invention.

GPS module 714 of system 700 is shown in FIG. 14. Specifically, the GPS module includes a firewall processor function 1406, an embedded GPS receiver 1404, and a clock training circuit 1402. GPS module 714 is also configured to perform encryption/decryption and other network/communication functions to support ECM processing. For example, the ECM system may configure the bands as well as the threat detection functions based on the location provided by GPS module 714. In general, GPS module 714 communicates with the other modules in system 700 via input/output lines 790 (1)-790(10).

Figure 15:
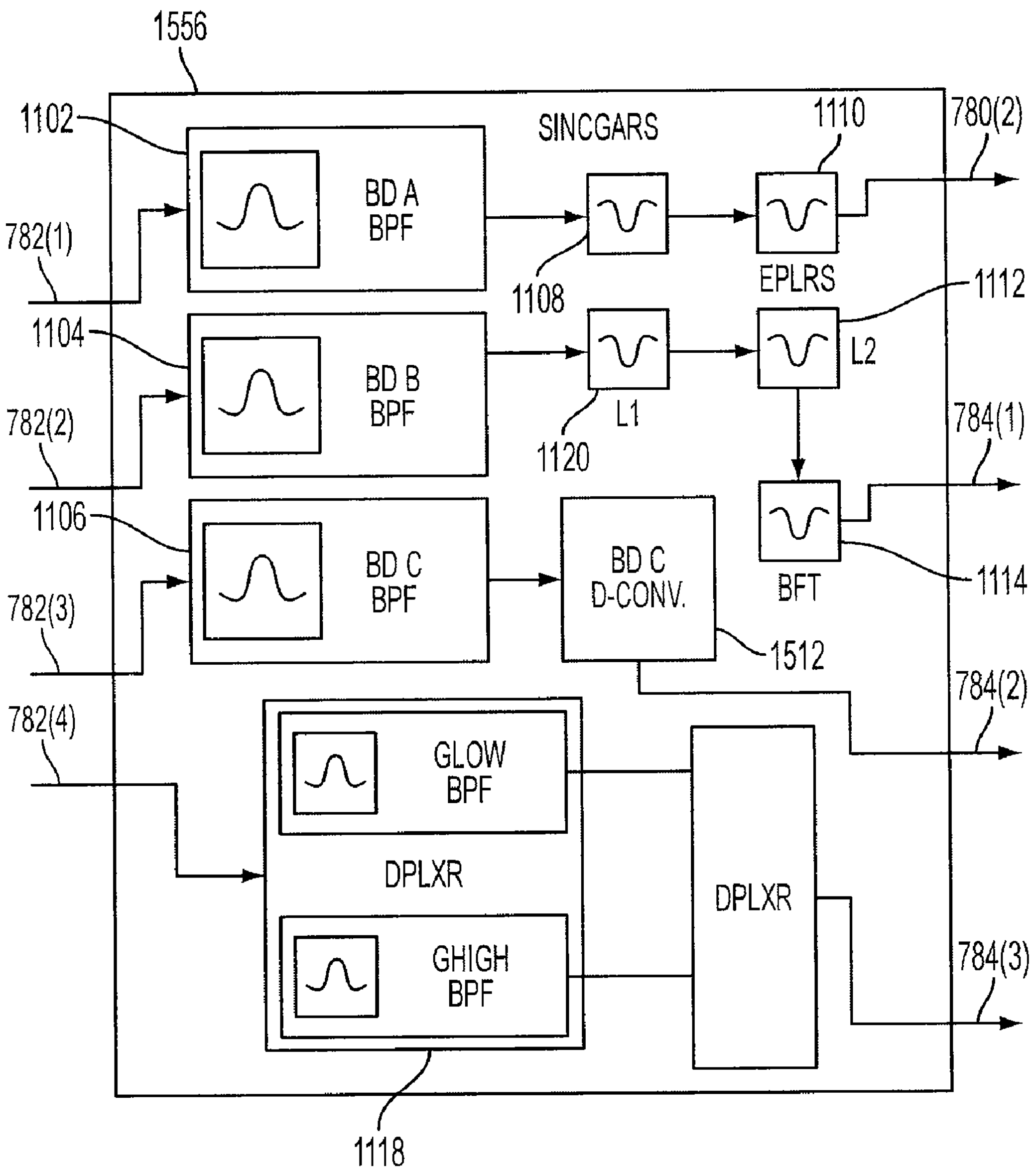
FIG. 15 is a block diagram of a single transceiver type receive compatibility module for the vehicle mounted ECM system in FIG. 7, according to an embodiment of the present invention.
Figure 16:
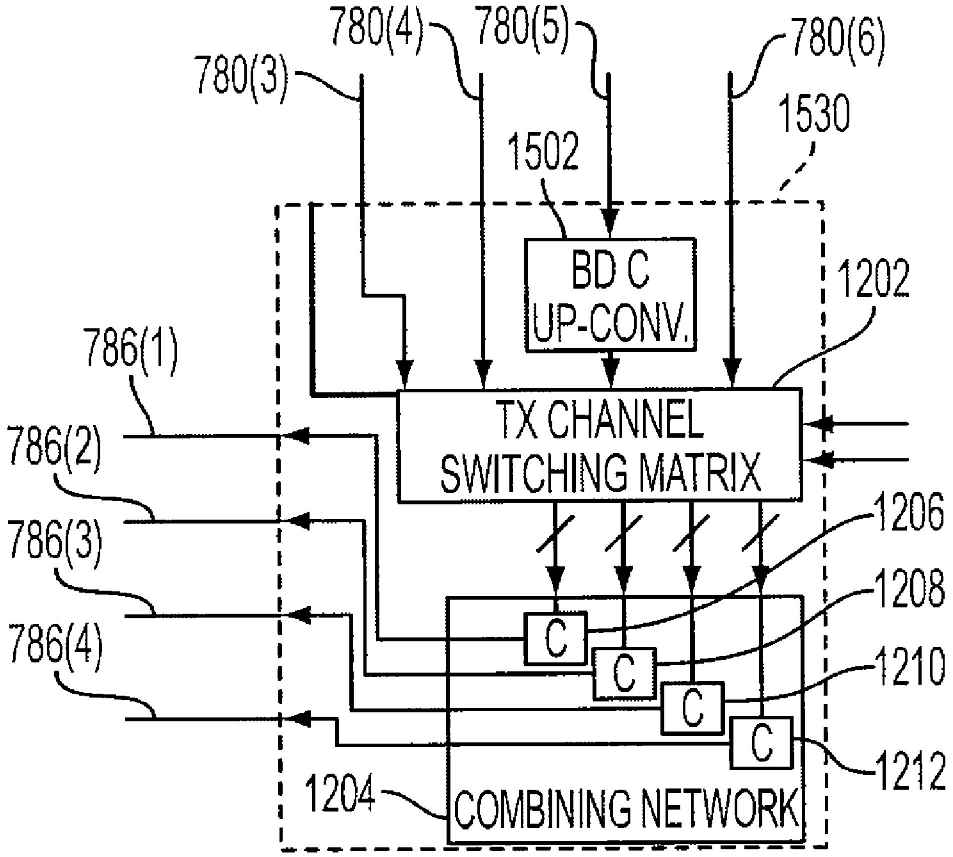
FIG. 16 is a block diagram of a single transceiver type transmit distribution module for the vehicle mounted ECM system in FIG. 7, according to an embodiment of the present invention.

The multi-transceiver receive compatibility module 756 in FIG. 7 may be alternately configured as a single transceiver type (e.g. the transceivers are tunable to the same frequency range) receive compatibility module 1556 in FIG. 15 which includes an additional band C down converter 1512. Similarly, the dual transceiver type transmit distribution module 730 in FIG. 7 may be configured as a single transceiver type transmit distribution module 1530 with a band C up conversion module 1502 as shown in FIG. 16. In general, the addition of the up/down conversion modules provides functionality for the high frequency signals in band C to fall in the tunable range of a common transceiver type that may be utilized for the bands.

Figure 17A:
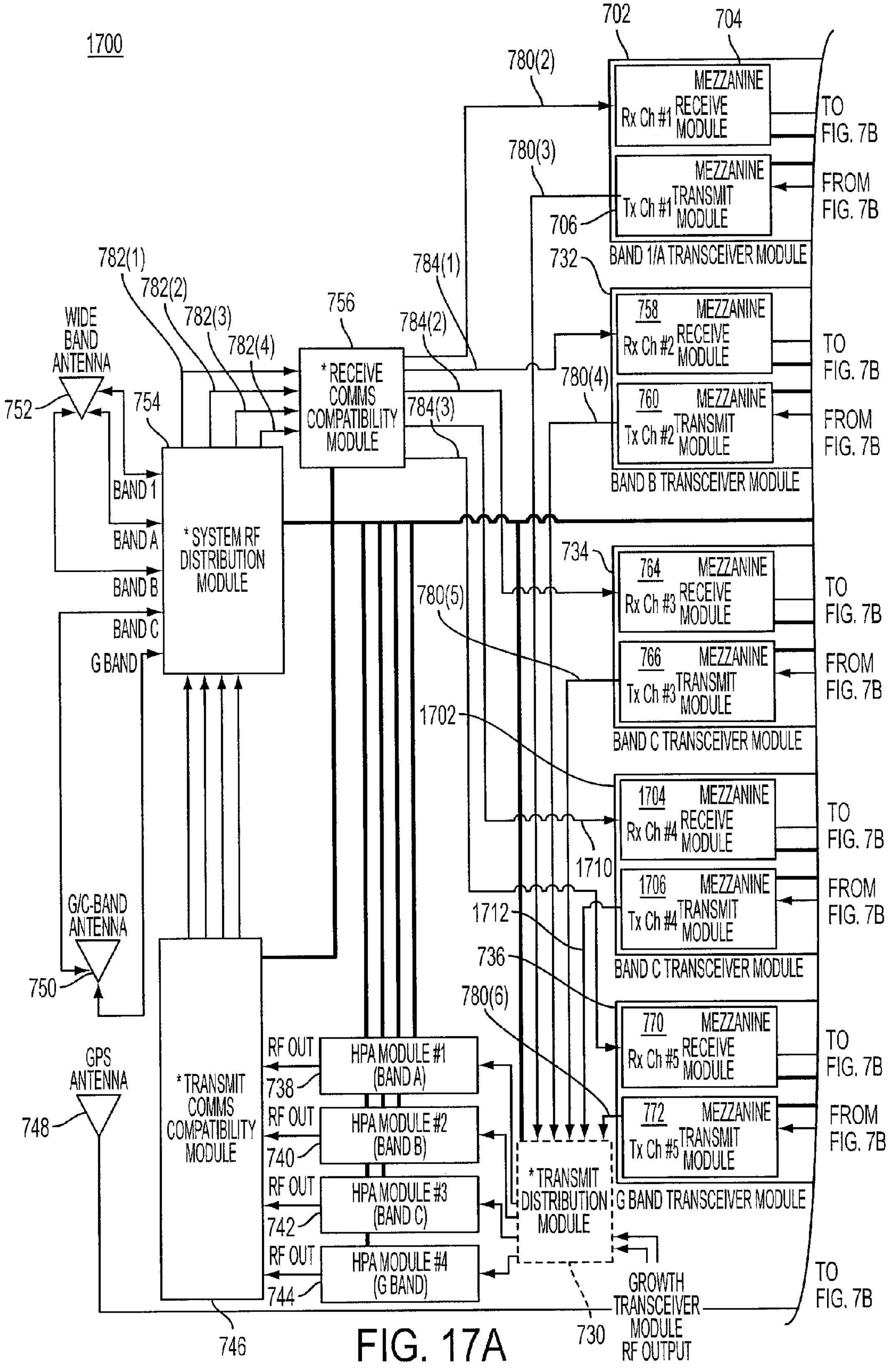
FIG. 17 is a fixed mounted ECM system, according to an embodiment of the present invention.
Figure 17B:
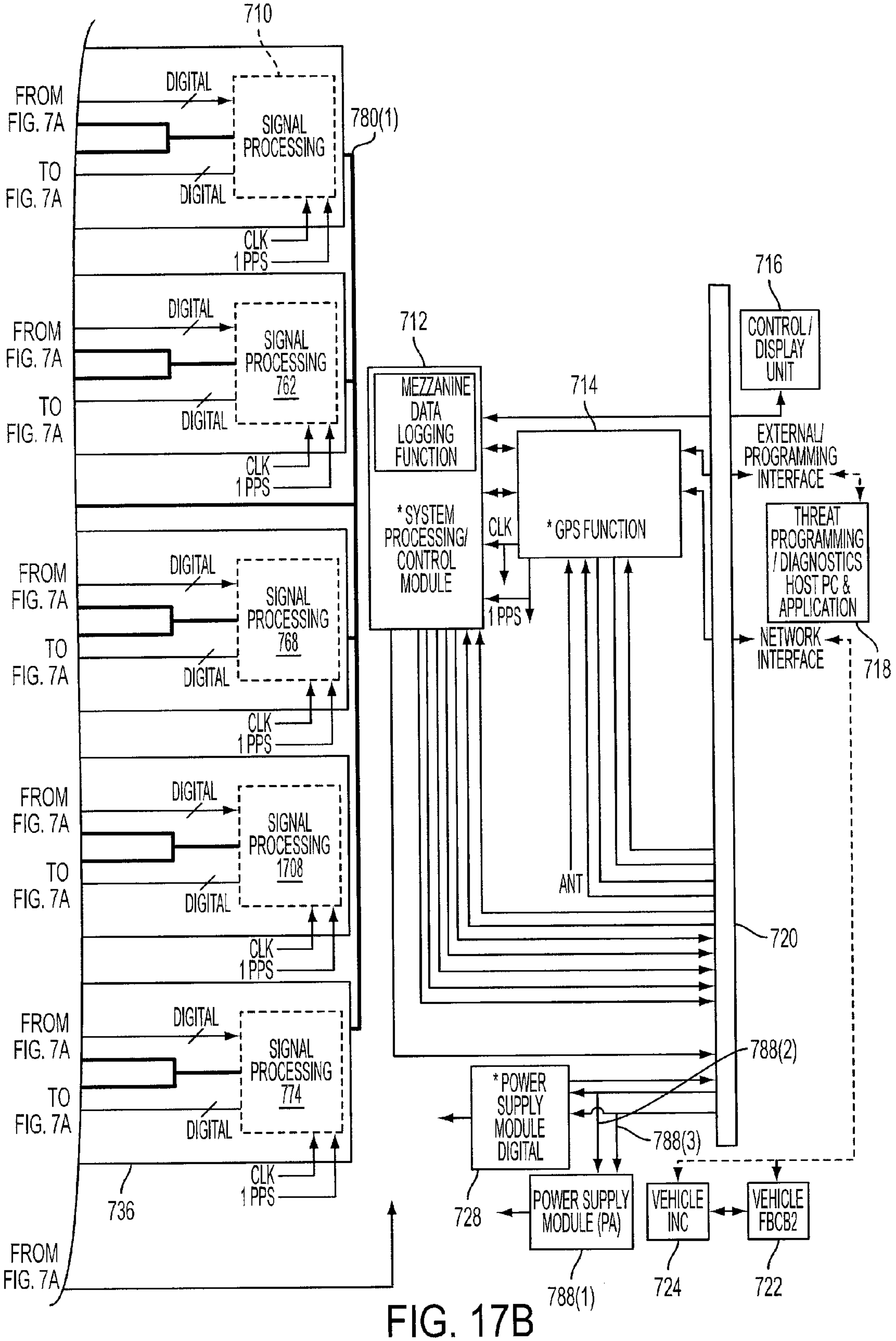

As previously described, system 700 is a vehicle mounted ECM system including band 1/A, band B, band C and band G transceiver modules. In another embodiment, FIG. 17 shows a fixed ECM system 1700 (e.g. in a fixed location), which includes band 1/A, band B, dual band C and band G modules. In general, the difference between the vehicle mounted ECM system 700 and the fixed ECM system 1700, is the addition of the second band C transceiver module 1702 including receive module 1704, transmit module 1706 and signal processing module 1708. In the fixed system (e.g. mounted at an entrance of a building) a second band C transceiver module may be beneficial to effectively scan the entire range of a broad band C. It should be noted that the transceivers for the other bands may also be duplicated. Other than the addition of the second band C module, the fixed ECM system 1700 is somewhat similar to the mounted ECM system 700.

Figure 18:
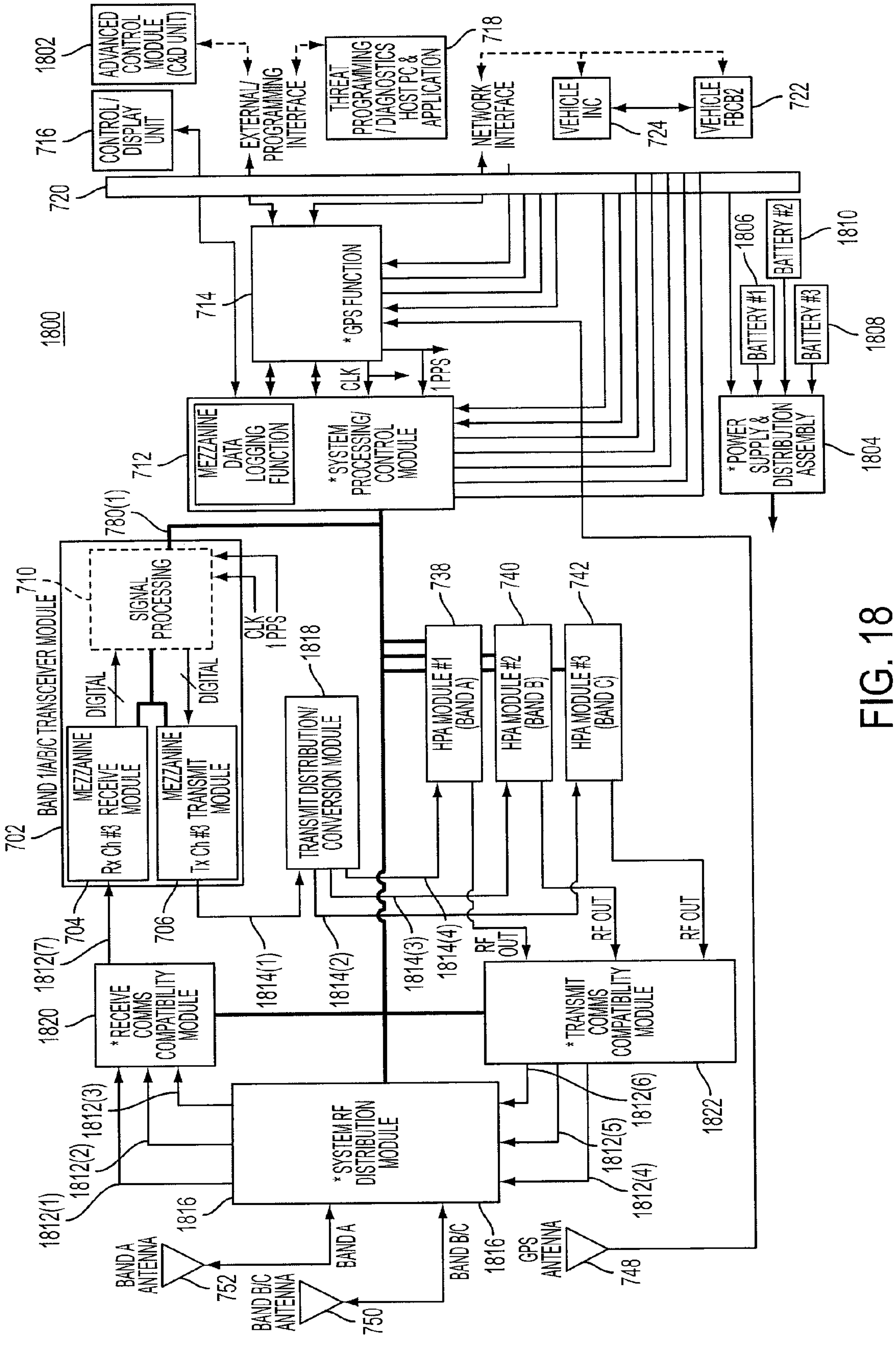
FIG. 18 is a block diagram of a dismounted ECM system, according to an embodiment of the present invention.

In yet another embodiment, FIG. 18 shows a dismounted ECM system (a dismounted single transceiver system that may be carried on a person). In this embodiment, the dismounted system 1800 includes one transceiver module 702 which scans bands 1/A, B and C in a sequential manner, batteries 1806-1810 for supplying power to the mobile system, and advanced control unit 1802 for external programming. In this embodiment, only a single transceiver module in utilized to reduce power consumption and size of the overall system. Transceiver module 1802, scans bands 1/A, B and C by time division multiplexing (TDM) so that each band may be appropriately monitored. Since only one transceiver module is utilized in dismounted system 1800, various other components have also been modified as compared to the vehicle mounted and fixed systems shown in FIGS. 7 and 17.

Figure 19:
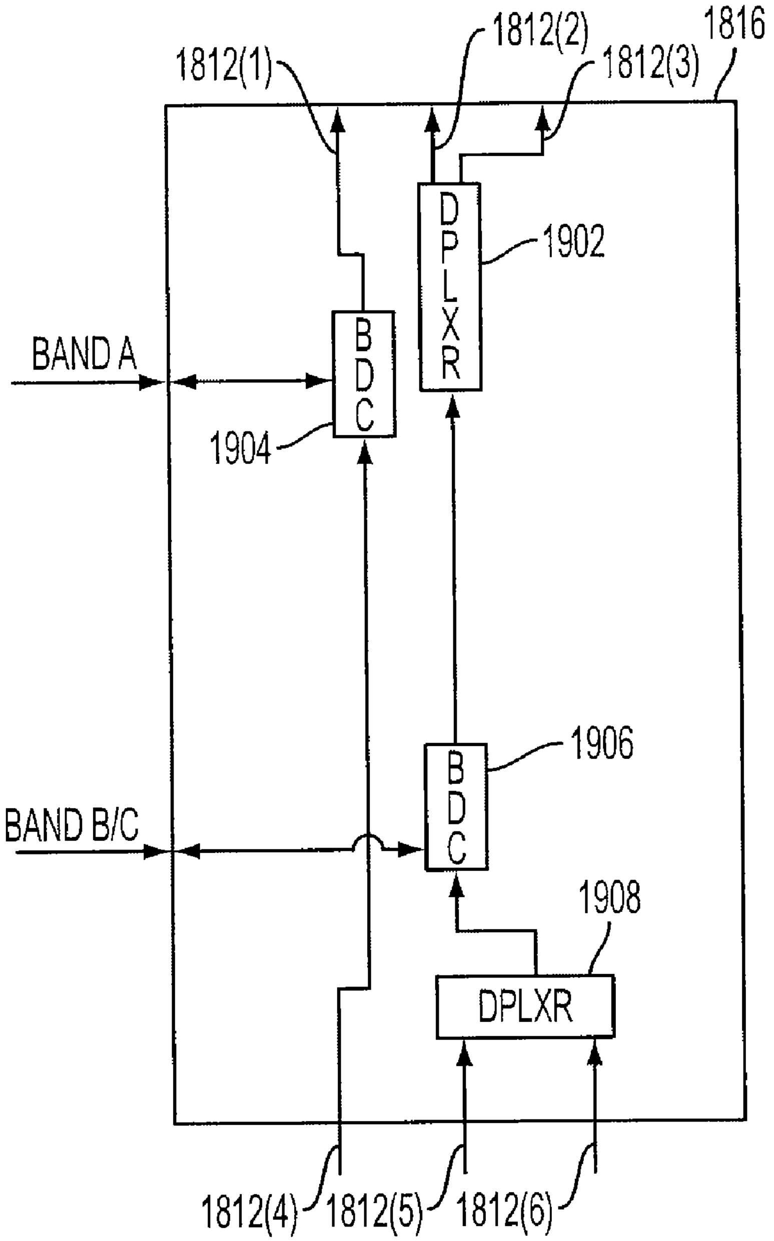
FIG. 19 is a block diagram of a radio frequency (RF) distribution module for the dismounted ECM system in FIG. 18, according to an embodiment of the present invention.
Figure 20:
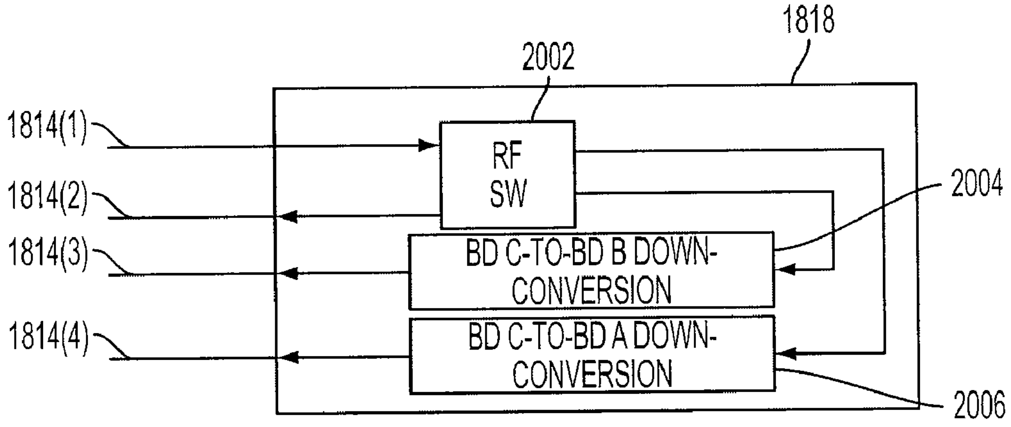
FIG. 20 is a block diagram of a transmit distribution module for the dismounted ECM system in FIG. 18, according to an embodiment of the present invention.
Figure 21:
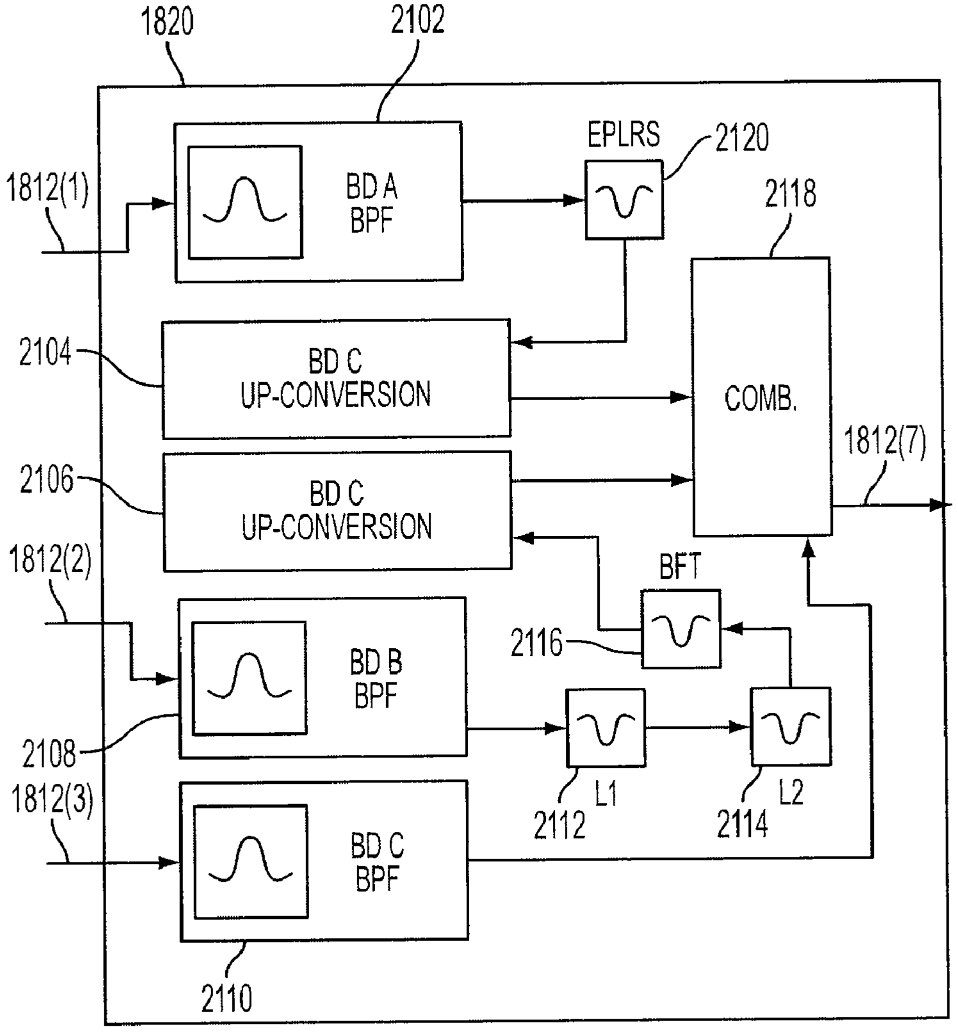
FIG. 21 is a block diagram of a receive compatibility module for the dismounted ECM system in FIG. 18, according to an embodiment of the present invention.
Figure 22:
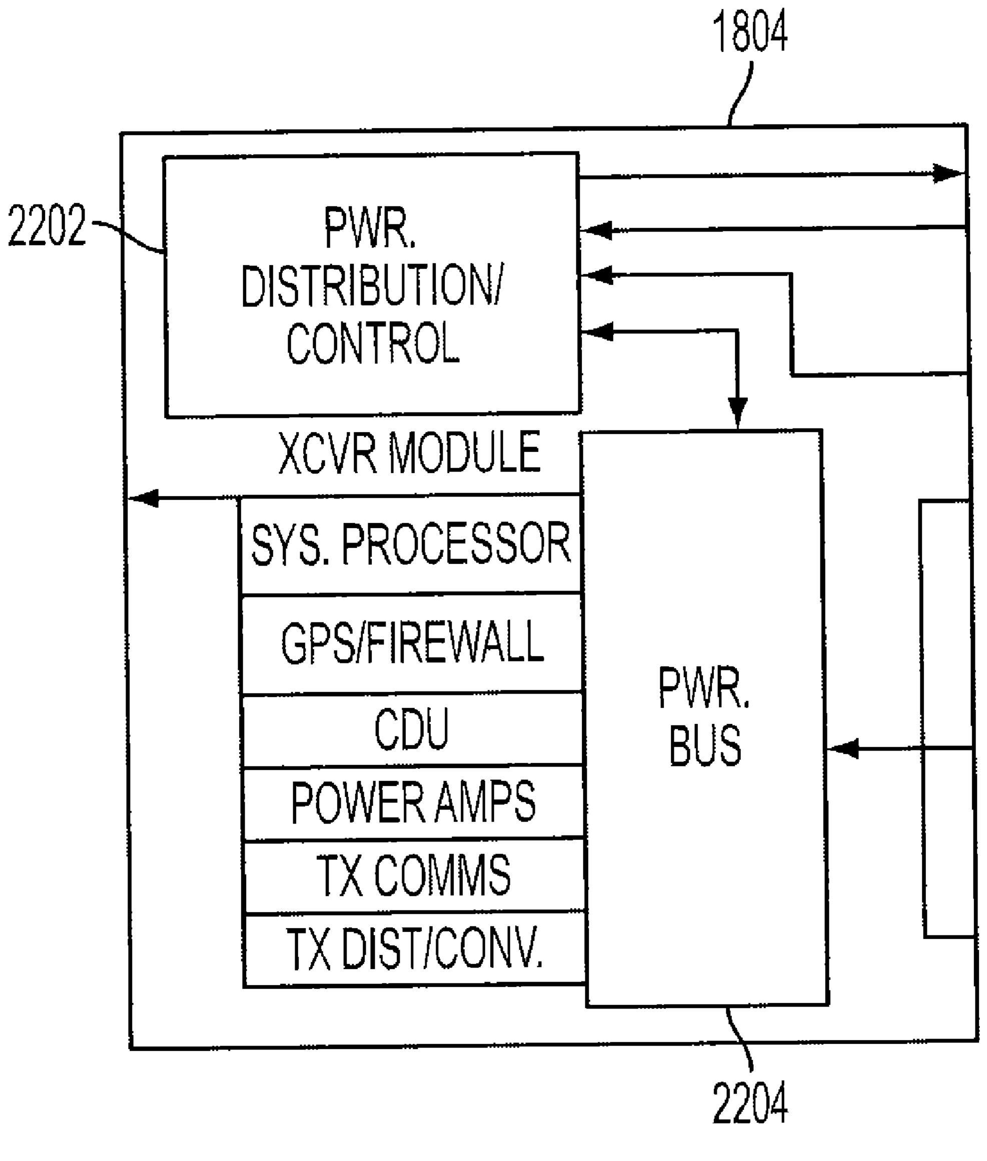
FIG. 22 is a block diagram of a power supply module for the dismounted ECM system in FIG. 18, according to an embodiment of the present invention.

For example, the RF distribution module 1816 in FIG. 18 is configured to include block down converters 1904 and 1906, diplexers 1902 and 1908 and input/output lines 1812(1)-1812 (6) as shown in FIG. 19. Also, transmit distribution module 1818 is configured with RF switch 2002, and block up-conversion functions 2004 and 2006 to up-convert the C band to the B and A bands respectively, and input/output lines 1814 (1)-1814(4) as shown in FIG. 20.

Furthermore, receive compatibility module 1820 includes band A, B and C filters 2102, 2108 and 2110. Module 1820 also includes band C conversion 2104 and 2106, combiner 2118, band stop filters 2120, 2112, 2114 and 2116, and input/output lines 1812(1)-1812(3) and 1812(7).

Also, in the dismounted system 1800, the power supply module 1804 is configured to include power distribution control 2202 and a power bus 2204. Specifically, the power bus supplies power to various components in the dismounted system such as the GPS unit, power amplifiers, transmission section, and compatibility module.

Figure 23:
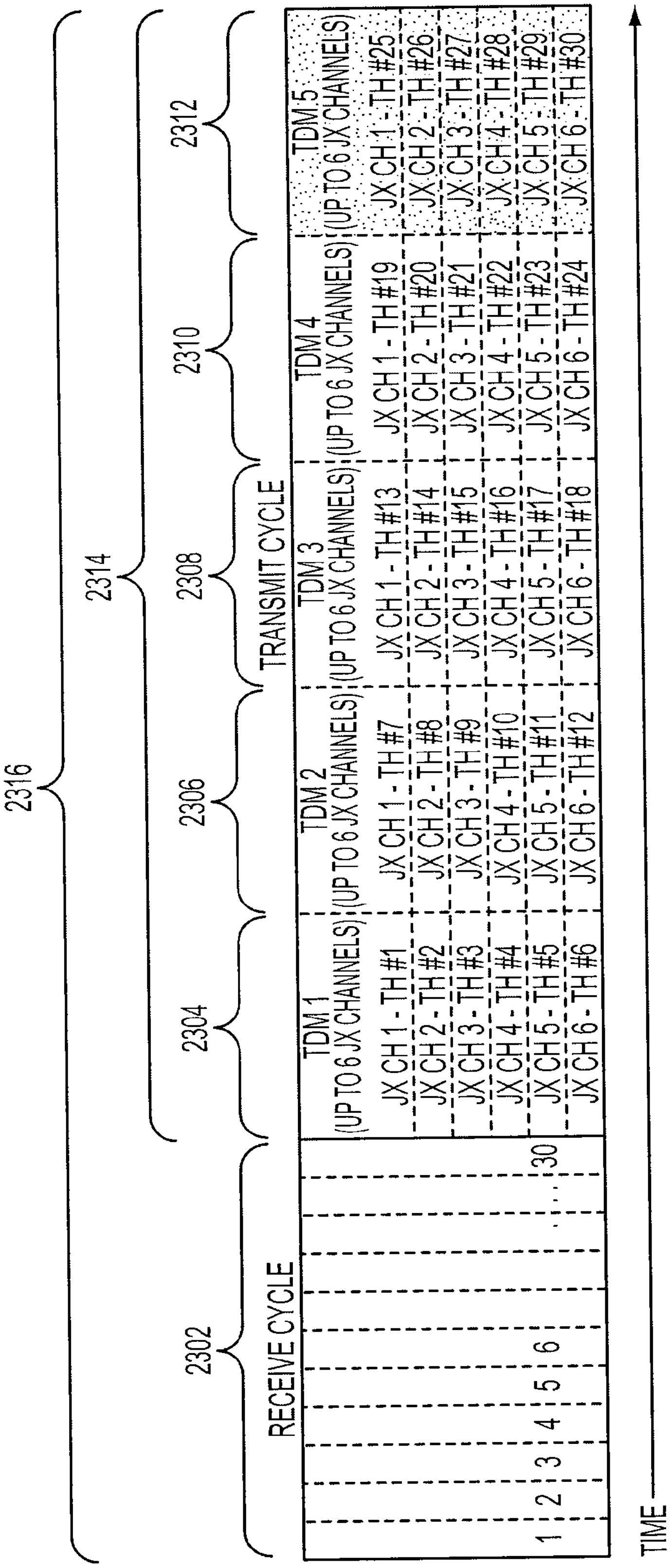
FIG. 23 is a transceiver timing chart showing a receive cycle and a transmit cycle for an ECM system, according to an embodiment of the present invention.

As previously described, the transceiver in the ECM system monitors the sub-bands for threats and then transmits ECM signals in a TDM manner. FIG. 23 shows a transceiver timing chart having an ECM operation cycle 2316 for a transceiver in the vehicle mounted 700, fixed 1700 and dismounted 1800 ECM systems. The timing chart receive cycle 2302 includes 30 sub-bands inside a particular band which are monitored in a time sequential manner. Thus, in this example, the system can identify 30 different threats in 30 different sub-bands (e.g. bands 1/A, B, C and G may each be sectioned to have 30 sub-bands).

The signals received in the sub-bands are sequentially packetized as they are received and then serially routed to the signal processing FPGAs in the ECM system to identify threats. If threats are determined to exist in any of the sub-bands, then appropriate ECM signals are generated.

The ECM signals (e.g. six in parallel, and 30 overall) are then frequency multiplexed and transmitted in a TDM manner in transmit cycle 2314. For example, six ECM signals may be transmitted simultaneously in transmission window 2304 to simultaneously address six threats that may occur in six sub-bands. Similarly, the system may then transmit six more ECM signals during window 2306 to address six other threats in six other sub-bands. Thus over the entire transmit cycle 2314, each transmission window 2304, 2306, 2308, 2310 and 2312 is able to transit six ECM signals to address six threats at a time and thirty threats overall. It should be noted that the number of monitored sub-bands and the number of simultaneously transmitted ECM signals may be modified to suit a particular system.

Each transceiver in the ECM system is able to perform transceiver cycle 2316 as shown in FIG. 23. This allows a plurality of transceivers (in the vehicle mounted and fixed ECM systems) to simultaneously monitor bands (e.g. A, B, C and G) and address potential threats within those bands. In the dismounted ECM system (having only one transceiver), the ECM operation cycle 2316 may be repeated by the single transceiver to address each of the bands (e.g. band 1/A, B, C and G may be monitored and addressed sequentially).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An electronic countermeasure (ECM) transceiver comprising:

a receiver configured to sequentially receive a plurality of signals in respective frequency sub-bands;

a processor including:

a receive processor configured to packetize the received signals and sequentially output the received signal packets;

a threat processor configured to sequentially receive the received signal packets, identify the received signals as threats and sequentially output threat identification packets;

an ECM processor configured to sequentially receive the threat identification packets, generate ECM packets based on the threat identification packets, and sequentially output the ECM packets; and a transmit processor configured to convert the sequential ECM packets into parallel ECM signals and frequency multiplex the parallel ECM signals; and a transmitter configured to simultaneously transmit the parallel ECM signals in the respective frequency sub-bands to address the threats.

2. The electronic countermeasure (ECM) transceiver of claim 1, further comprising:

a packet generator configured to convert the received signals, and ECM signals into respective sequential packets; and a packet switch configured to simultaneously route the packets between the receiver, processor and transmitter.

3. The electronic countermeasure (ECM) transceiver of claim 1, further comprising:

a control processor configured to control the receiver, processor and transmitter to perform ECM.

4. The electronic countermeasure (ECM) transceiver of claim 3, further comprising:

a programming interface for programming the receiver, processor, transmitter and control processor.

5. An electronic countermeasure (ECM) method comprising the steps of:

a) sequentially receiving, by a receiver, a plurality of signals in respective frequency sub-bands;

b) identifying, by a processor, the sequentially received signals as threats, generating a plurality of ECM signals based on the identified threats and sequentially outputting the ECM signals; and c) simultaneously transmitting, by a transmitter, the ECM signals in the respective frequency sub-bands to address the threats;

wherein step (b) includes:

(i) packetizing the received signals:

(ii) identifying the received signals as threats and sequentially outputting threat identification packets;

(iii) generating ECM packets based on the threat identification packets and sequentially outputting the ECM packets; and (iv) converting the sequential ECM packets into parallel ECM signals and frequency multiplexing the parallel ECM signals;

wherein step (c) includes:

(i) simultaneously transmitting the parallel ECM signals.

6. The electronic countermeasure (ECM) method of claim 5, further comprising the steps of:

repeating, by a transceiver, steps a-c in the frequency sub-bands of at least a first frequency band and a second frequency band.

7. The electronic countermeasure (ECM) method of claim 5, further comprising the steps of:

performing, by at least a first transceiver and a second transceiver, steps a-c, in a respective first frequency band and second frequency band.

8. The electronic countermeasure (ECM) method of claim 5, further comprising the steps of:

sequentially monitoring M frequency sub-bands in a frequency band; and simultaneously, in a first time period, transmitting N ECM signals in N of the M frequency sub-bands, where N and M are integers.

9. The electronic countermeasure (ECM) method of claim 8, further comprising the steps of:

simultaneously, in at least a second time period following the first time period, transmitting at least another N ECM signals in at least another N frequency sub-bands.

10. The electronic countermeasure (ECM) method of claim 5, further comprising the steps of:

addressing M threats by transmitting M ECM signals N at a time over P successive time periods, wherein M=N*P and M, N and P are integers.

11. The electronic countermeasure (ECM) method of claim 5, further comprising the steps of:

converting the received signals and ECM signals into respective sequential packets; and sequentially routing the packets between the receiver, processor and transmitter.

12. The electronic countermeasure (ECM) method of claim 5, further comprising the steps of:

programming the receiver, processor and transmitter to perform various ECM processes.

13. An electronic countermeasure (ECM) transceiver comprising:

a receiver configured to sequentially receive a plurality of signals in respective frequency sub-bands;

a processor configured to sequentially receive the plurality of signals, identify the received signals as threats, generate ECM signals based on the threats and sequentially output the ECM signals;

a transmitter configured to simultaneously transmit the ECM signals in the respective frequency sub-bands to address the threats;

a packet generator configured to convert the received signals, and ECM signals into respective sequential packets; and a packet switch configured to sequentially route the packets between the receiver, processor and transmitter.

14. The electronic countermeasure (ECM) transceiver of claim 13, further comprising:

a receive processor configured to packetize the received signals and sequentially output the received signal packets to the processor.

15. The electronic countermeasure (ECM) transceiver of claim 14, further comprising:

a threat processor configured to sequentially receive the received signal packets, identify the received signals as threats and sequentially output threat identification packets.

16. The electronic countermeasure (ECM) transceiver of claim 15, further comprising:

an ECM processor configured to sequentially receive the threat identification packets, generate ECM packets based on the threat identification packets and sequentially output the ECM packets.

17. The electronic countermeasure (ECM) transceiver of claim 16, further comprising:

a transmit processor configured to convert the sequential ECM packets to parallel ECM signals and frequency multiplex the parallel ECM signals via complex up-conversion and filtering.

* * * * *